United States Patent
Bourges-Sevenier

(10) Patent No.: US 9,448,823 B2
(45) Date of Patent: Sep. 20, 2016

(54) PROVISION OF A DOWNLOAD SCRIPT

(71) Applicant: MOTOROLA MOBILITY LLC, Libertyville, IL (US)

(72) Inventor: Mikael L. Bourges-Sevenier, Santa Clara, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 599 days.

(21) Appl. No.: 13/648,366

(22) Filed: Oct. 10, 2012

(65) Prior Publication Data
US 2013/0191442 A1    Jul. 25, 2013

Related U.S. Application Data

(60) Provisional application No. 61/590,799, filed on Jan. 25, 2012.

(51) Int. Cl.
*G06F 15/16*  (2006.01)
*G06T 15/00*  (2011.01)
*G06F 9/455*  (2006.01)

(52) U.S. Cl.
CPC ................... *G06F 9/45512* (2013.01)

(58) Field of Classification Search
CPC .............. H04L 29/08072; H04L 29/0809; H04L 29/06; G06F 17/3089; G06F 9/3851; G06Q 10/10; G06T 15/005; G06T 1/20; G06T 15/04; G09G 5/363
USPC ....................................................... 709/218
See application file for complete search history.

(56) References Cited

U.S. PATENT DOCUMENTS

| | | | |
|---|---|---|---|
| 6,823,504 B1 | 11/2004 | Sokolov | |
| 6,826,553 B1* | 11/2004 | DaCosta | G06F 17/30867 |
| 6,826,581 B2 | 11/2004 | Moslander et al. | |
| 6,880,083 B1* | 4/2005 | Korn | G06F 21/52 |
| | | | 713/170 |
| 6,898,786 B1 | 5/2005 | Sokolov | |
| 6,951,014 B1 | 9/2005 | Sokolov | |
| 7,287,106 B2 | 10/2007 | Wu | |
| 8,365,205 B2 | 1/2013 | Chen et al. | |
| 8,477,143 B2* | 7/2013 | Harper | G06F 3/038 |
| | | | 345/522 |
| 2002/0083154 A1* | 6/2002 | Auffray | G06F 17/243 |
| | | | 709/218 |

(Continued)

OTHER PUBLICATIONS

Herman, Typed Array Specification, Oct. 7, 2011, pp. 1-11.

*Primary Examiner* — David Lazaro
*Assistant Examiner* — Mahran Abu Roumi
(74) *Attorney, Agent, or Firm* — McDermott Will & Emery LLP

(57) ABSTRACT

Disclosed are machine processors and methods performed thereby. The processor has access to processing units for performing data processing and to libraries. Functions in the libraries are implementable to perform parallel processing and graphics processing. The processor may be configured to acquire (e.g., to download from a web server) a download script, possibly with extensions specifying bindings to library functions. Running the script may cause the processor to create, for each processing unit, contexts in which functions may be run, and to run, on the processing units and within a respective context, a portion of the download script. Running the script may also cause the processor to create, for a processing unit, a memory object, transfer data into that memory object, and transfer data back to the processor in such a way that a memory address of the data in the memory object is not returned to the processor.

20 Claims, 9 Drawing Sheets

(56) References Cited

U.S. PATENT DOCUMENTS

| | | | |
|---|---|---|---|
| 2005/0144614 A1* | 6/2005 | Moslander | G06F 8/65 717/168 |
| 2011/0161495 A1* | 6/2011 | Ratering | G06F 9/5044 709/226 |
| 2013/0097410 A1 | 4/2013 | Bourges-Sevenier | |
| 2013/0103931 A1 | 4/2013 | Bourges-Sevenier | |
| 2013/0117305 A1 | 5/2013 | Varakin et al. | |
| 2013/0141443 A1 | 6/2013 | Schmit et al. | |
| 2013/0176320 A1 | 7/2013 | Bourges-Sevenier | |
| 2013/0191560 A1* | 7/2013 | Aho | G06F 5/14 710/57 |
| 2013/0198325 A1 | 8/2013 | Bourges-Sevenier | |
| 2013/0212365 A1 | 8/2013 | Chen et al. | |
| 2013/0332666 A1 | 12/2013 | Haruki | |

* cited by examiner

PROVISION OF A DOWNLOAD SCRIPT

CROSS-REFERENCE TO RELATED APPLICATIONS

The present application claims the benefit of U.S. Provisional Patent Application No. 61/590,799, entitled "MEMORY MAPPING COMMANDS FOR WEBGL EXTENSION FOR WEBCL," filed Jan. 25, 2012, and is related to U.S. patent application Ser. No. 13/648,341, entitled "MACHINE PROCESSOR," filed Oct. 10, 2012, issued as U.S. Pat. No. 9,069,549, U.S. patent application Ser. No. 13/648,349, entitled "MACHINE PROCESSOR," filed Oct. 10, 2012; U.S. patent application Ser. No. 13/648,354, entitled "MACHINE PROCESSOR," filed Oct. 10, 2012, issued as U.S. Pat. No. 9,348,676, and U.S. patent application Ser. No. 13/648,373, entitled "PROVISION AND RUNNING A DOWNLOAD SCRIPT," filed Oct. 10, 2012.

TECHNICAL FIELD

The present disclosure is related generally to providing a download script.

BACKGROUND

The OpenCL™ framework is a framework for writing computer programs. OpenCL™ provides for parallel computing to be performed. Further information on OpenCL™ may be found, for example, in "The OpenCL™ Specification Version: 1.1," A. Munshi, June 2011, which is incorporated herein by reference.

Typically, websites, web pages, web applications, etc., are provided in the form of scripts (e.g., in HTML format or in JavaScript™, etc.) and are not compiled computer programs.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
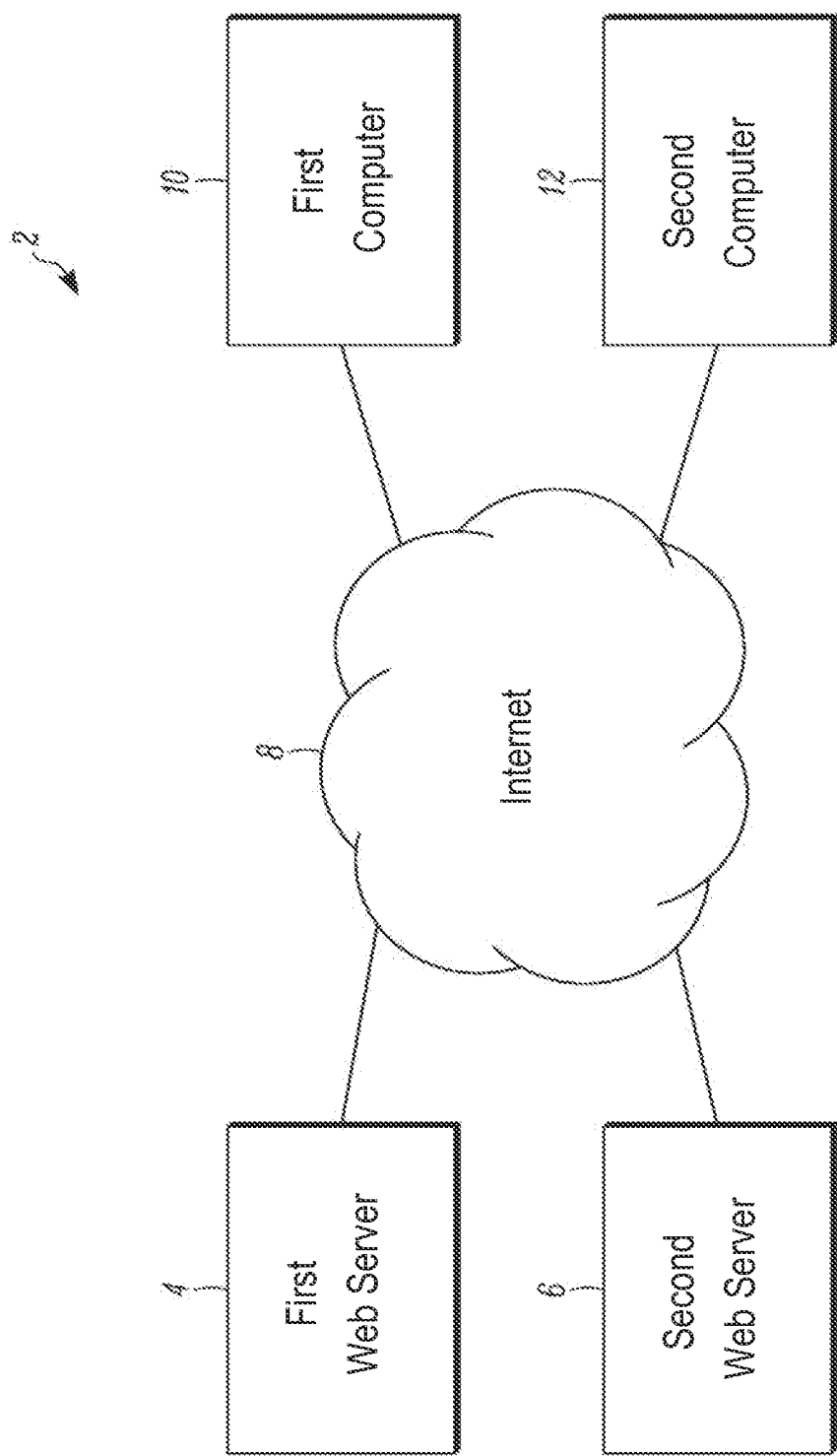
FIG. 1 is a schematic illustration (not to scale) of an example network.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present inventors have realized that as websites become more complicated there is a desire or need for websites, web pages, web applications, etc., to use the power of the computers they are running on (i.e., there is a desire for web pages, etc., to be able to use the multiple processor cores, graphics cards, etc., of a computer). The present inventors have realized that, in order to do so, a mechanism that allows access to the OpenCL™ methods and functions from within a script needs to be provided.

Embodiments provide a machine processor (e.g., a virtual machine processor such as a JavaScript™ module capable of executing JavaScript™ commands) and a method performed by the machine processor. The machine processor may have access to one or more underlying processing units (e.g., a graphics processing unit or a central processing unit of a computer) for performing data processing. The machine processor may have access to a function library (e.g., an OpenCL™ function library, which is described in more detail below) which may contain one or more functions (e.g., OpenCL™ functions, which are described in more detail below). The functions may be implementable by the underlying processing units to perform parallel processing. The machine processor may be configured to acquire (e.g., by downloading over the Internet from a web server) a download script (e.g., a web page, etc.). This download script may comprise commands (e.g., written in JavaScript™) for the machine processor that comprises a binding (e.g., a JavaScript™ binding) to a corresponding function in the function library. The machine processor may be further configured to run the download script such that the commands are run. This may cause the machine processor to create, for each underlying processing unit, a context (i.e., a parallel context) in which one or more of the functions may be run, and run, on one or more underlying processing units and within a respective context, a portion of the download script.

Further embodiments provide a machine processor (e.g., a virtual machine processor such as a JavaScript™ module capable of executing JavaScript™ commands) and a method performed by the machine processor. The machine processor may have access to an underlying processing unit (e.g., a graphics processing unit or a central processing unit of a computer) for performing data processing. The machine processor may have access to a function library (e.g., an OpenCL™ function library, which is described in more detail below) which may contain one or more functions (e.g., OpenCL™ functions, which are described in more detail below). The functions may be implementable by the underlying processing unit, e.g., to perform parallel processing. The machine processor may be configured to acquire (e.g., by downloading over the Internet from a web server) a download script (e.g., a web page, etc.). This download script may comprise commands (e.g., written in JavaScript™) for the machine processor that comprises a binding (e.g., a JavaScript™ binding) to a corresponding function in the function library. The machine processor may be further configured to run the download script such that the commands are run. This may cause the machine processor to create, for the underlying processing unit, a memory object or buffer, thereby reserving at least part of the memory of that underlying processing unit into which data may be transferred from the machine processor, and to transfer data from the machine processor into that memory object or buffer. The memory object or buffer may be such that the underlying processing unit for which the memory object or buffer has been created may process the data transferred into the memory object or buffer. Running the script may further cause data (after having been processed by the processing unit) to be transferred back from the memory object or buffer to the machine processor in such a way that a memory address of the data in the memory object or buffer is not returned to the machine processor.

Further embodiments provide a machine processor (e.g., a virtual machine processor such as a JavaScript™ module capable of executing JavaScript™ commands) and a method performed by the machine processor. The machine processor may have access to an underlying processing unit (e.g., a graphics processing unit) for performing data processing. The machine processor may have access to a function library (e.g., an OpenCL™ function library, which is described in more detail below) which may contain one or more functions (e.g., OpenCL™ functions, which are described in more detail below). The functions may be implementable by the underlying processing unit, e.g., to perform parallel processing. The machine processor may also have access to a further function library (e.g., an OpenGL™ function library, which is described in more detail below) which may contain one or more further functions (e.g., OpenGL™ functions, which are described in more detail below). The further functions may be implementable by the underlying processing unit, e.g., to perform graphics processing or rendering. The machine processor may be configured to acquire (e.g., by downloading over the Internet from a web server) a download script (e.g., a web page, etc.). This download script may comprise commands (e.g., written in JavaScript™) for the machine processor that comprises a binding (e.g., a JavaScript™ binding) to a corresponding function or further function. The machine processor may be further configured to run the download script such that the commands are run. This may cause the machine processor to: create, for the underlying processing unit, a context in which one or more of the functions may be run; create, for the underlying processing unit, a further context in which one or more of the further functions may be run; run, on the underlying processing unit and within the context, a portion of the download script; and run, on the underlying processing unit and within the further context, a further portion of the download script.

Further embodiments provide methods and apparatus for providing download script for accessing or downloading by a machine processor (for running by the machine processor). The machine processor may have access to one or more underlying processing units (e.g., a graphics processing under or a central processing unit of a computer) for performing data processing. The machine processor may have access to a function library (e.g., an OpenCL™ function library, which is described in more detail below) which may contain one or more functions (e.g., OpenCL™ functions, which are described in more detail below). The functions may be implementable by the underlying processing units to perform parallel processing. The methods may comprise a computer sending (e.g., via the Internet), to a first web server, a request for an extension to be returned to the computer. The extension may specify one or more bindings to a corresponding function in the function library. The extension may be such that, when run (e.g., by the machine processor), a corresponding function from the function library is called. The method may further comprise, after receiving the request, the web server sending the extension back to the computer. The computer may then receive the requested extension which may then be used to write a script for implementation by the machine processor. The script may be uploaded to a further web server from which it may be accessed or downloaded by the machine processor.

Further embodiments provide methods and apparatus for storing (e.g., on a web server) and running a download script. The download script may be stored such that it is accessible or downloadable by a machine processor. The machine processor may have access to one or more underlying processing units (e.g., a graphics processing unit or a central processing unit of a computer) for performing data processing. The machine processor may have access to a function library (e.g., an OpenCL™ function library, which is described in more detail below) which may contain one or more functions (e.g., OpenCL™ functions, which are described in more detail below). The functions may be implementable by the underlying processing units to perform parallel processing. The script may be such that, when run by the machine processor, the machine processor creates, for an underlying processing unit, a memory object or buffer, thereby reserving at least part of the memory of that underlying processing unit into which data may be transferred from the web browser. The memory object or buffer may be such that a data type for each data item within the memory object or buffer is specified, thereby providing that data may be stored in the memory object or buffer as a typed array.

An apparatus for implementing any of the below described arrangements, and for performing any of the below described methods, may be provided by configuring or adapting any suitable apparatus, for example one or more computers or other processing apparatus or processors, or providing additional modules. The apparatus may include a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

It should be noted that certain of the processes depicted in the below described process flowcharts may be omitted or such processes may be performed in an order different from that presented below and shown in the process flowcharts. Furthermore, although all the processes have, for convenience and ease of understanding, been depicted as discrete and temporally-sequential, nevertheless some of the processes may in fact be performed simultaneously or at least overlapping to some extent temporally.

Referring now to the figures, FIG. 1 is a schematic illustration (not to scale) of an example network 2 in which embodiments can be implemented.

The network 2 comprises a first web server 4, a second web server 6, the Internet 8, a first computer 10, and a second computer 12.

The first web server 4 is described in more detail below with reference to FIG. 2. The first web server 4 is connected to each of the second web server 6, the first computer 10, and the second computer 12. These connections are via the Internet 8. These connections are such that information may be sent between the first web server 4 and each of the second web server 6, the first computer 10, and the second computer 12, e.g., as described in more detail below with reference to FIGS. 7, 9, and 11.

The second web server 6 is described in more detail below with reference to FIG. 3. In addition to being connected to the first web server 4, the second web server 6 is connected to the first computer 10 and to the second computer 12. These connections are via the Internet 8. These connections are such that information may be sent between the second web server 6 and each of the first computer 10 and the second computer 12, e.g., as described in more detail below with reference to FIGS. 7, 9, and 11.

In this embodiment, the first and second web servers 4, 6 are separate web servers. However, in other embodiments, the first and second web servers 4, 6 may be provided by a single web server.

The first computer 10 is described in more detail below with reference to FIG. 4. In addition to being connected to the first and second web servers 4, 6 (via the Internet 8), the first computer 10 is connected to the second computer 12. The connection between the first computer 10 and the second computer 12 may be via the Internet 8. The connection between the first computer 10 and the second computer 12 is such that information may be passed between the first computer 10 and the second computer 12, e.g., as described in more detail below with reference to FIGS. 7, 9, and 11.

In this embodiment, the first and second computers 10, 12 are separate computing devices. However, the functionality (described in more detail below) of the first and second computers 10, 12 may be provided by a different number computing devices, e.g., by a single computing device.

The second computer 12 is described in more detail below with reference to FIG. 6.

Each of the first and second computers 10, 12 may be any appropriate type of computer, for example, a desktop personal computer, a laptop computer, a tablet computer, a mobile station, a smartphone, a netbook, etc.

Figure 2:
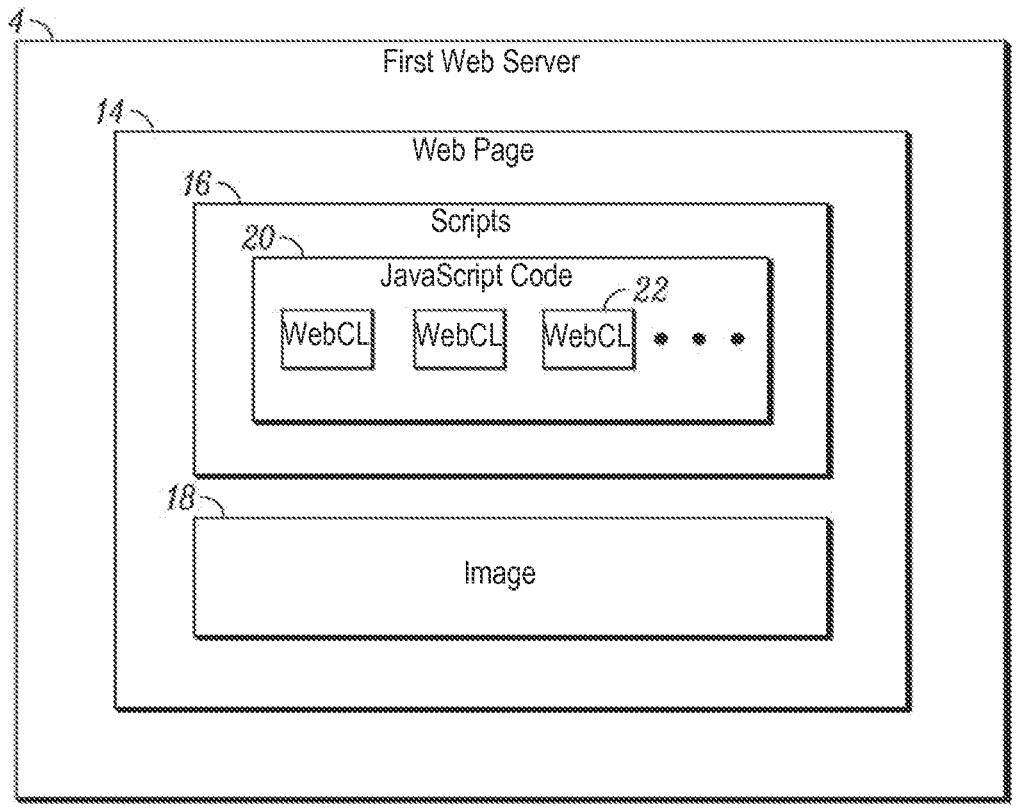
FIG. 2 is a schematic illustration (not to scale) of a first web server.

FIG. 2 is a schematic illustration (not to scale) of the first web server 4.

In this embodiment, the first web server 4 hosts a web page 14. The web page 14 is accessible or downloadable by the first computer 10 (via the Internet 8). The web page 14 may comprise HTML code, Cascading Style Sheets, scripts (indicated in FIG. 2 by a box and the reference numeral 16), and an image (indicated in FIG. 2 by a box and the reference numeral 18). The image 18 may, for example, be in the form of a .jpg file. In other embodiments, a reference to an image that may be used to retrieve or locate that image may form part of the web page 14.

The scripts 16 comprise code written in the JavaScript™ scripting language. This JavaScript™ code is indicated in FIG. 2 by a box and the reference numeral 20. The scripts 16 may further comprise other scripts that may, for example, include kernel code.

The JavaScript™ code 20 comprises one or more commands. The commands are hereinafter referred to as "WebCL commands" and are indicated in FIG. 2 by the reference numeral 22. The WebCL commands 22 are commands for an application programming interface (API), hereinafter referred to as the "WebCL API." The WebCL API is described in more detail below with reference to FIG. 5. In this embodiment, the WebCL API is located on the first computer 10. In other words, the WebCL commands 22 are commands that are specified using a framework, hereinafter referred to as the "WebCL framework." The WebCL framework is described in more detail below. The WebCL API is an API for the WebCL framework.

In this embodiment, the first web server 4 hosts a web page 14 specified using a script 16. However, in other embodiments the script 16 may specify different content, i.e., other than a web page. For example, in other embodiments, the script 16 may specify image or video data.

Figure 3:
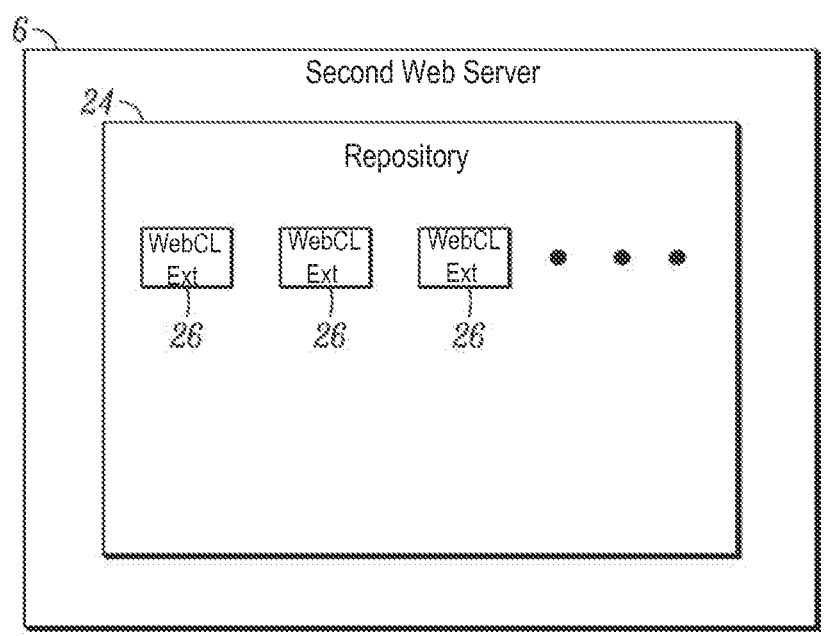
FIG. 3 is a schematic illustration (not to scale) of a second web server.

FIG. 3 is a schematic illustration (not to scale) of the second web server 6.

The second web server 6 comprises a repository 24 (i.e., memory or storage). The contents of the repository 24 are accessible or downloadable by the first and second computer 10, 12 (via the Internet 8). The repository 24 may comprise one or more extensions, hereinafter referred to as "WebCL extensions" and indicated in FIG. 3 by the reference numeral 26. WebCL extensions 26 are described in more detail below. A WebCL extension 26 may comprise or specify one or more commands, methods, interfaces, attributes, etc., for use by a computer programmer or software developer when writing WebCL scripts or by the WebCL API. A WebCL extension 26 may comprise or specify one or more commands, methods, interfaces, attributes, etc., that do not form part of the WebCL framework.

Figure 4:
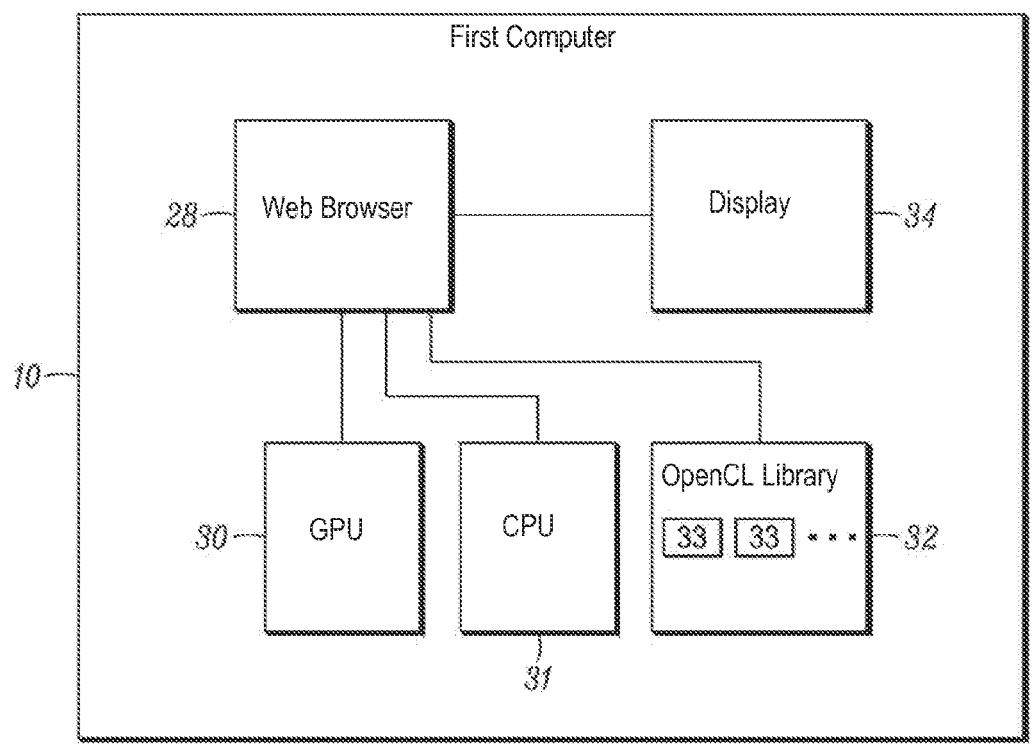
FIG. 4 is a schematic illustration (not to scale) of a first computer.

FIG. 4 is a schematic illustration (not to scale) of the first computer 10.

The first computer 10 comprises a web browser 28, a graphical processing unit (GPU) 30, a central processing unit (CPU) 31, an OpenCL™ library 32, and a display 34.

The web browser 28 is described in more detail below with reference to FIG. 5. The terminology "web browser" is used herein to refer an application that may retrieve and process information resources on the World Wide Web (via the Internet 8). The web browser 28 is connected to the GPU 30 and to the CPU 31 such that information may be sent between the web browser 28 and each of the GPU 30 and the CPU 31. The web browser 28 may, for example, be running on the CPU 31. Also, the web browser 28 is connected to the OpenCL™ library 32 such that information stored in the OpenCL™ library 32 may be retrieved from the OpenCL™ library 32 by the web browser 28. Also, the web browser 28 is connected to the display 34 such that information may be sent from the web browser 28 to the display 34.

The OpenCL™ library 32 is a library comprising functions, methods, interfaces, attributes, etc., of the OpenCL™ framework. Such functions, methods, interfaces, attributes, etc., of the OpenCL™ framework are indicated schematically in FIG. 4 by boxes and by the reference numeral 33. The OpenCL™ framework is a framework for heterogeneous parallel computing. Further information on OpenCL™ may be found, for example, in "The OpenCL™ Specification Version: 1.1," A. Munshi, June 2011.

The OpenCL™ library 32 and the web browser 28 may be linked (e.g., statically or dynamically). For example, a static linking between the OpenCL™ library 32 and the web browser 28 may provide that OpenCL™ code may be compiled as part of the web browser. Also for example, a dynamic linking between the OpenCL™ library 32 and the web browser 28 may provide that the OpenCL™ library 32 may be installed somewhere else on the first computer 10, and the web browser 28 may simply access the OpenCL™ library 32.

The GPU 30 and the CPU 31 may each be configured to process information received from the web browser 28. For example, a computer program received by the GPU 30 (or by the CPU 31) may be implemented by the GPU 30 (or by the CPU 31, respectively). Information that has been processed by the web browser 28 may be returned from the GPU 30 (or from the CPU 31) to the web browser 28. The functionalities of the GPU 30 and the CPU 31 are described in more detail below with reference to FIGS. 7 and 9. Each of the GPU 30 and the CPU 31 may be controlled or accessed using OpenCL™ commands or language. In other words, the GPU 30 and the CPU 31 are pieces of hardware that can be controlled or accessed using OpenCL™. Thus, the GPU 30 and the CPU 31 are both "OpenCL™ devices" as defined in "The OpenCL™ Specification Version: 1.1," A. Munshi, June 2011. In some embodiments, a different type of OpenCL™ device, e.g., a different type of CPU, a different type of GPU, etc., may be used instead of or in addition to the GPU 30 or the CPU 31.

The display 34 may be any appropriate type of display, e.g., a touch-screen display. The display 34 may be configured to display information sent to it from the web browser 28.

Figure 5:
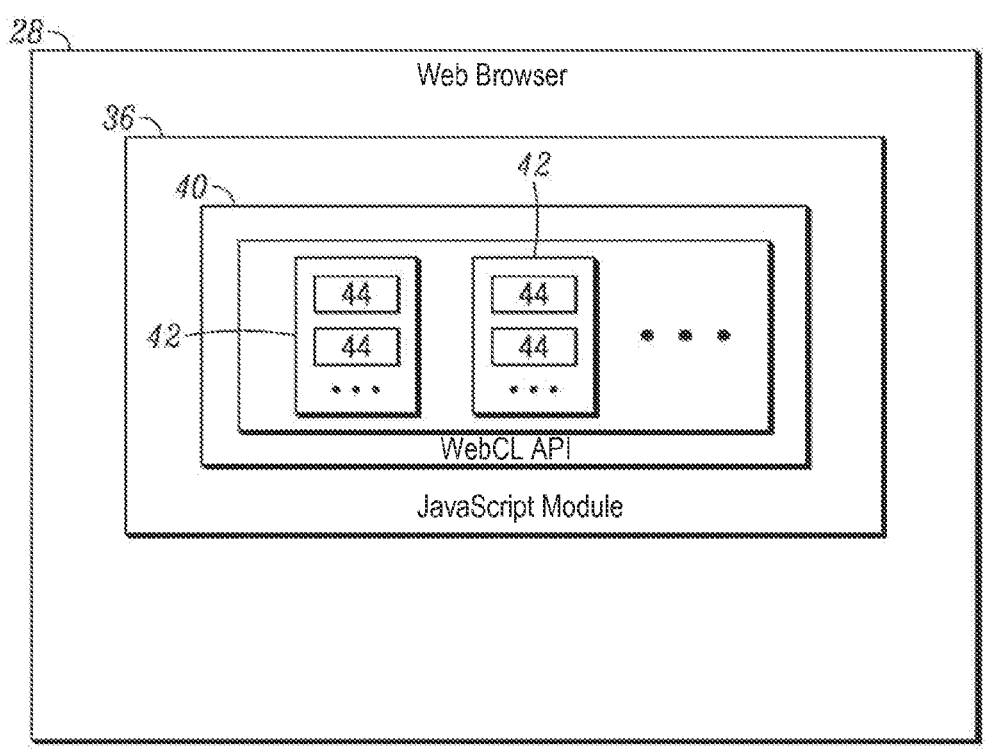
FIG. 5 is a schematic illustration (not to scale) of a web browser.

FIG. 5 is a schematic illustration (not to scale) of the web browser 28.

The web browser 28 comprises a JavaScript™ module 36. The JavaScript™ module 36 is configured to process, run, or execute the JavaScript™ code 20 of the web page 14. The JavaScript™ module 36 therefore provides a machine processor, or virtual machine processor, for processing scripts. The JavaScript™ module 36 comprises the WebCL API 40.

The WebCL API 40 is an API for a framework, hereinafter referred to as the "WebCL framework" and described in more detail below. The WebCL framework is a JavaScript™ binding for the OpenCL™ framework. The WebCL framework advantageously allows for the execution of OpenCL™ code in JavaScript™. OpenCL™ code advantageously tends to facilitate or allow computer applications to use or exploit the power of a computer (e.g., by executing programs using multiple processor cores, graphics cards, etc.). The WebCL API 40 is configured to process, run, or execute the WebCL commands 22 of the JavaScript™ code 20 of the web page 14. The WebCL API 40 may act as an interface between the web browser 28 and the OpenCL™ library 32 such that when a WebCL command 22 is run by the web browser 28, OpenCL™ functions 33 corresponding to that WebCL command 22 are called.

In this embodiment, the WebCL API 40 may comprise or have access to one or more interfaces, hereinafter referred to as "WebCL interfaces" and indicated in FIG. 5 by the reference numeral 42. Each WebCL interface 42 may comprise one or more methods or objects, which are jointly indicated in FIG. 5 by the reference numeral 44. When processing, running, or executing a WebCL command 22, the WebCL API 40 may call a corresponding OpenCL™ function or method 33 (from the OpenCL™ library 32). In other words, when a WebCL command 22 is run, the OpenCL™ function that that WebCL command 22 is a binding to may be called. Thus, running WebCL commands can be thought of as "translating" those commands into the OpenCL™ language, e.g., for use by an "OpenCL™ device." An OpenCL™ device is defined in "The OpenCL™ Specification Version: 1.1," A. Munshi, June 2011. In this embodiment, the GPU 30 of the first computer 10 is an OpenCL™ device and may be controlled using OpenCL™ commands, methods, functions, etc.

The web browser 28 may further comprise a number of further modules not shown in the figures. For example, the web browser 28 may comprise a kernel module that may function as a bridge between the web browser application and the data processing hardware (e.g., the GPU 30 or the CPU 31) of the first computer 10. Such a kernel may be configured to manage the resources of the first computer 10.

Figure 6:
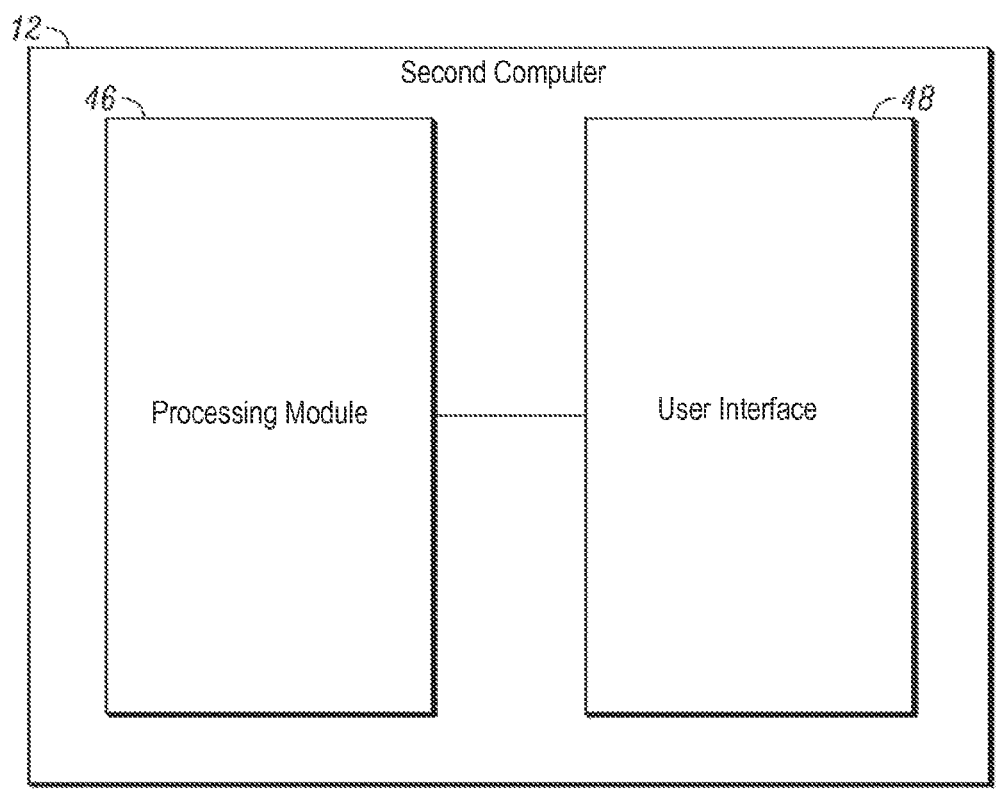
FIG. 6 is a schematic illustration (not to scale) of a second computer.

FIG. 6 is a schematic illustration (not to scale) of the second computer 12.

The second computer 12 comprises a processing module 46 and a user interface 48.

The processing module 46 is connected to the user interface 48 such that information may be passed between the processing module 46 and the user interface 48. The processing unit 46 is also configured to receive information via the Internet 8, e.g., from a web server 4, 6. The processing module 46 is configured to process information received by it.

The user interface 48 may receive inputs from a user of the second computer 12. A user of the second computer 12 may be a computer programmer, website designer, software developer, etc. The user interface 48 may, for example, comprise a user input device (e.g., a keyboard, a mouse, etc.) and a display.

The functionalities of the processing module 46 and of the user interface 48 are described in more detail below with reference to FIG. 11.

Example methods that may be performed by the entities of the network 2 are now described.

Figure 7:
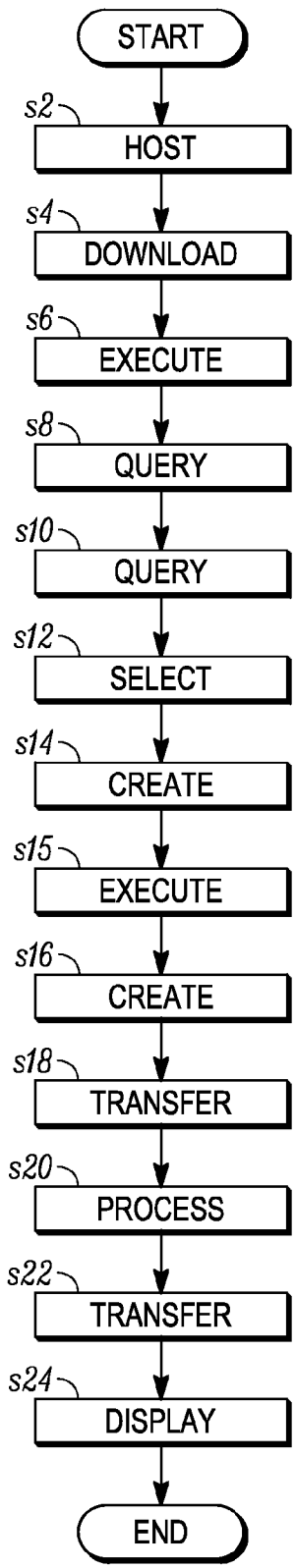
FIG. 7 is a process flowchart showing certain steps of a process of displaying a web page.

FIG. 7 is a process flowchart showing certain steps of an embodiment of a process by which the web page 14 may be displayed by the first computer 10.

At step s2, the first web server 4 hosts the web page 14. In other words, the web page 14 is stored by the first web server 4 and made available for access or download via the Internet 8 by one or more client devices.

At step s4, the first computer 10 accesses or downloads (via the Internet 8) the web page 14. The script 16 (including the JavaScript™ WebCL commands 22) and the image data 18 may be downloaded onto the first computer 10. This process may comprise a user of the first computer 10 inputting into the first computer 10 a web address for the web page 14. The first computer 10 may then, using the web address, retrieve the web page 14 from the first web server 4.

At step s6, the web browser 28 of the first computer 10 executes or runs the script 16 of the web page 14. For example, the script 16 may be run in a line-by-line fashion. The JavaScript™ module 36 of the web browser 28 may execute or run any JavaScript™ code 20 in the script 16. Also, the WebCL API 40 may execute or run any WebCL commands 22.

At step s8, when, or before, a WebCL command 22 is encountered in the script 16, the script 16 being run by the web browser 28 may query whether the WebCL language is supported by the web browser 28. For example, it may be queried by the script 16 whether or not the WebCL API 40 has been installed on the web browser 28, is part of the web browser 28, or is in some other way accessible by the web browser 28.

The querying as to whether or not WebCL is supported by the web browser 28 may be performed by running any appropriate code or script, for example:

```
//First check if the WebCL extension is installed at all
if (WebCL == undefined) {
alert("WebCL not supported.");
return;
}
```

In this embodiment, the WebCL API 40 is installed on the web browser 28. In other words, in this embodiment, the WebCL language is supported by the web browser 28. However, in other embodiments, WebCL may not be supported, and an exception or error may be returned.

At step s10, after it has been determined that WebCL is supported by the web browser 28, the running of the script 16 by the web browser 28 may query what platform (i.e., operating platform, i.e., the type of the first computer 10) the web browser 28 is running on. It may also be queried what OpenCL™ devices (i.e., hardware accelerators or other processing devices or modules that may be operated or controlled using the OpenCL™ programming language) are available to the web browser 28.

The querying as to what platform the WebCL API 40 is running on may be performed by running any appropriate code or script, for example:

```
var platformList=WebCL.getPlatformIDs( );
platform=platformList[0]; // select the first platform
or using the following method:
    WebCLPlatform[ ] getPlatformIDs( )
```

This method is expressed in the interface description language (IDL) or web-IDL. That is to say, the first part of the method (WebCLPlatform[ ], i.e., an identifier for a platform that WebCL is running on) is the object or value that is returned by the method, the second part of the method (getPlatformIDs) is the function name, i.e., the function, of the method, and the third part of the method (which is expressed in parentheses and in this case is empty) is the parameters used by the function. In other words, the function getPlatformIDs( ) will return identifiers for the platform the WebCL API 40 is running on, i.e., the first computer 10.

The querying as to what OpenCL™ devices are available may be performed using the following method (which is expressed using IDL):

WebCLDevice[ ] getDevices(int device_type)

In other words, the function getDevices may use a parameter that specifies a device type (e.g., GPU-type, etc.) to return identifiers for available OpenCL™ devices. In this embodiment, an identifier for each of the GPU 30 and the CPU 31 (which are OpenCL™ devices) may be returned.

At step s12, the GPU 30 or the CPU 31 are selected as the OpenCL™ device(s) that are to process some or all of the web page data (e.g., data relating to the image 18).

At step s14, the running of the script 16 (i.e., the Web CL commands 22) by the web browser 28 (and the WebCL API 40) creates a "WebCL context" in or for each of the selected OpenCL™ devices (i.e., the GPU 30 or the CPU 31). A context may be an execution context in which programs or code may be run. Thus, a WebCL context may be a runtime execution context for a WebCL program. A WebCL context may be used to provide a "link" or to allow communication between the OpenCL™ device (i.e., the GPU 30) and the web browser 28. Thus a WebCL context may be created for each selected OpenCL™ device. In other words, parallel contexts (i.e., contexts that may be used in parallel) may be created for multiple OpenCL™ devices. In other embodiments, parallel contexts may be created for a single selected OpenCL™ device.

The creation of a WebCL context on or for the GPU 30 or the CPU 31 may be performed by running any appropriate code or script, for example:

```
// create GPU context for this platform
context=newWebCL.WebCLContext(WebCL.CL_DEVICE_TYPE_GPU,[WebCL.CL_CONTEXT_PLATFORM, platform]);
``` or using any of the following methods (which are expressed using IDL):

WebCLContext createContext(int properties[ ], WebCLDevice devices[ ]);

WebCLContext createContext(int properties[ ], int device_type);

In other words, the function createContext may use a parameter that specifies a device type or device to create a context for in order to create a WebCLContext. In this embodiment, a WebCL context is created in or for the GPU 30.

At step s15, the execution or running of the script 16 is continued. This may comprise, when the web browser 28 (which may comprise the WebCL API 40) executes or runs a WebCL command 22, the web browser 28 (or WebCL API 40) calls a corresponding OpenCL™ function 33 (from the OpenCL™ library 32). The OpenCL™ function or method 33 called when a WebCL command 22 is executed may be the OpenCL™ function or method 33 for which that particular WebCL command 22 is a JavaScript™ binding.

The called OpenCL™ functions 33 may be run or executed within the WebCL context created within the GPU 30 (or within the parallel WebCL context created for the CPU 31). Thus, in effect, OpenCL™ code may be run in the context of a WebCL environment within or for the GPU 30.

Command queues may also be created to facilitate, organize, or manage the transfer of data from the web browser 28 (i.e., from the web browser's memory, i.e., the "host memory") to an OpenCL™ device memory (e.g., the GPU 30 or CPU 31), control execution of programs and kernels, synchronize events, etc. Code or methods that may be used to create command queues is provided below. A command queue may hold lists of functions, etc., that may then be executed (in list order).

In this embodiment, the script 16 specifies that data corresponding to the image 18 that are to be processed by the GPU 30. Steps s16 to s22 describe how this may be performed.

At step s16, the running of the script 16 (i.e., the Web CL commands 22) by the web browser 28 (and the WebCL API 40) creates a "WebCL memory object" in the WebCL context in the GPU 30. This WebCL memory object may be or comprise, or in some other way specify, an amount of memory to be reserved for the image data 18. The created WebCL memory object may be a buffer within the WebCL context. This buffer may be a buffer for containing general data or a buffer that may be optimized for containing image data (e.g., data relating to the image 18). The WebCL memory object may be a buffer configured to contain, e.g., either a JavaScript™ or untied array or a typed array of data.

In this embodiment, the WebCL memory object is a buffer that is configured to contain a typed array of data. Such a WebCL memory object may be provided as follows. The script 16 specifying the WebCL memory object, i.e., the buffer, may describe its layout, e.g., the script 16 may specify that the first value in the buffer is an integer, the second value is a float value, etc. A data item within a crated buffer may be specified as any appropriate data type, for example, an integer, a Boolean value, a character, a floating-point number, an alphanumeric string, a vector, etc. When the WebCL memory object is created (by running the script), the WebCL memory object has the specified layout. Thus, when the values within the WebCL memory object are set (by transferring data from the web browser 28 into the WebCL memory object buffer), the data type of each data item within the WebCL memory object is specified.

Thus, data types of the values in a C area of memory (i.e., GPU memory) may be set. Advantageously, this setting of the types of the values of a C area of memory tends to facilitate the use of local arguments, memory objects and samplers, and user-defined structures (e.g., within OpenCL™ restrictions). Furthermore, a problem that may be caused by the size of an array of values (JavaScript™ is untyped and so numbers are, in general, 64-bit double) tends to be overcome. In particular, these 64-bit double numbers may be unsupported by certain devices. This tends to make it impractical to identify the distinction between char, int, float types, etc., without inspecting the code of the kernel. This problem tends to be overcome by setting the data types of an area of memory as described herein.

At step s18, data (i.e., image data 18) are transferred, for the web browser 28, into the WebCL memory object within the WebCL context within the GPU 30.

Figure 8:
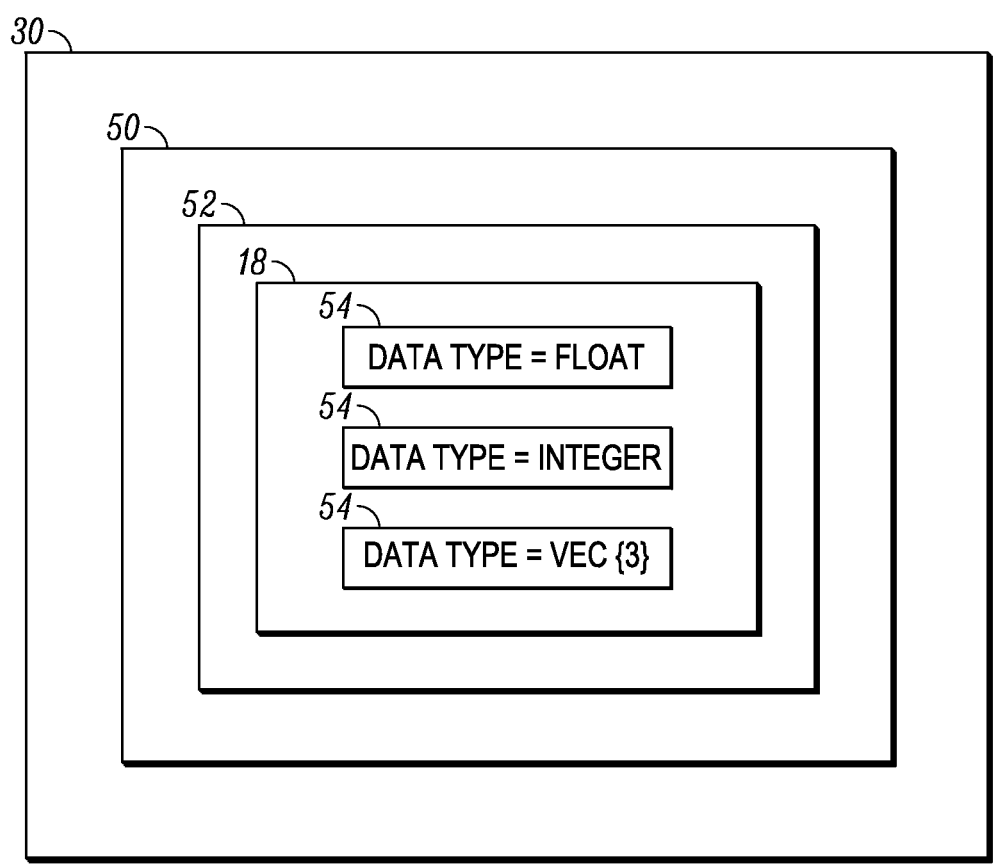
FIG. 8 is a schematic illustration (not to scale) of a graphical processing unit during the process of FIG. 7.

FIG. 8 is a schematic illustration (not to scale) of the GPU 30 at step s18. At step s18 the GPU 30 comprises the WebCL context 50 (which was created at step s14 and in which OpenCL™ functions and method may be executed), the WebCL memory object 52 (which was created at step s16), and the image data 18. The image data 18 may comprise a plurality of different data items 54. Each data item 54 may have a specified data type (e.g., integer, float, vec{3}, etc.). Thus, the memory layout of the WebCL memory object 52 may have been specified in the script 16, and the WebCL memory object 52 may be configured to store a typed array of data.

The transfer of the image data 18 from the web browser 28 (i.e., the host memory that may be provided, e.g., by a CPU 31) to the memory of the GPU 30 may comprise using one or more command queues to hold a list of commands that may be executed (in list order) to perform the transfer. Example code or method that may be used to create a command queue is provided below. A "write" command may be used to write the image data 18 onto the WebCL memory object 52.

At step s20, the image data 18 transferred to the WebCL memory object 52 in the GPU 30 are processed by the GPU 30. By running the script 16, the web browser 28 may run WebCL commands 22 that may call OpenCL™ functions 33 that may be run in the WebCL context 50 by the GPU 30 to process the image data 18.

The processing of the image data 18 by the GPU 30 may be managed or performed using one or more command queues. Example code or method that may be used to create a command queue is provided below.

At step s22, the processed image data 18 (i.e., the image data 18 after having been processed by the GPU 30) may be transferred back to the web browser 28.

The transfer of the image data 18 from the memory of the GPU 30 (i.e., the OpenCL™ device memory) to the web browser 28 (i.e., the host memory) may be managed or performed using one or more command queues. A "read" command may be used by the web browser 28 to read processed image data 18 from the WebCL memory object 52.

Some OpenCL™ methods, when implemented to process information, return values (i.e., processed information, e.g., the processed image data 18) as well as information that may be used to identify the one or more memory regions (e.g., a memory address for a region of the GPU 30) from which those values are returned. Using a WebCL memory object 52 (within a WebCL memory context 50 within the GPU 30) advantageously tends to "hide" the identity of the memory regions from which data are returned. Thus, identifiers for the memory regions tend not to be returned to the web browser 28. Advantageously, this may oppose or prevent a malicious party from using the information that identifies a memory region to access parts of the GPU 30 or other computer memory.

At step s24, the web page 14 may be displayed by the web browser 28 on the display 34 of the first computer 10 (e.g., to a user of the first computer 10). Displaying the web page 14 may comprise displaying an image that corresponds to or is specified by the processed image data 18.

Thus, a process by which the web page 14 may be displayed by the first computer 10 is provided.

Figure 9:
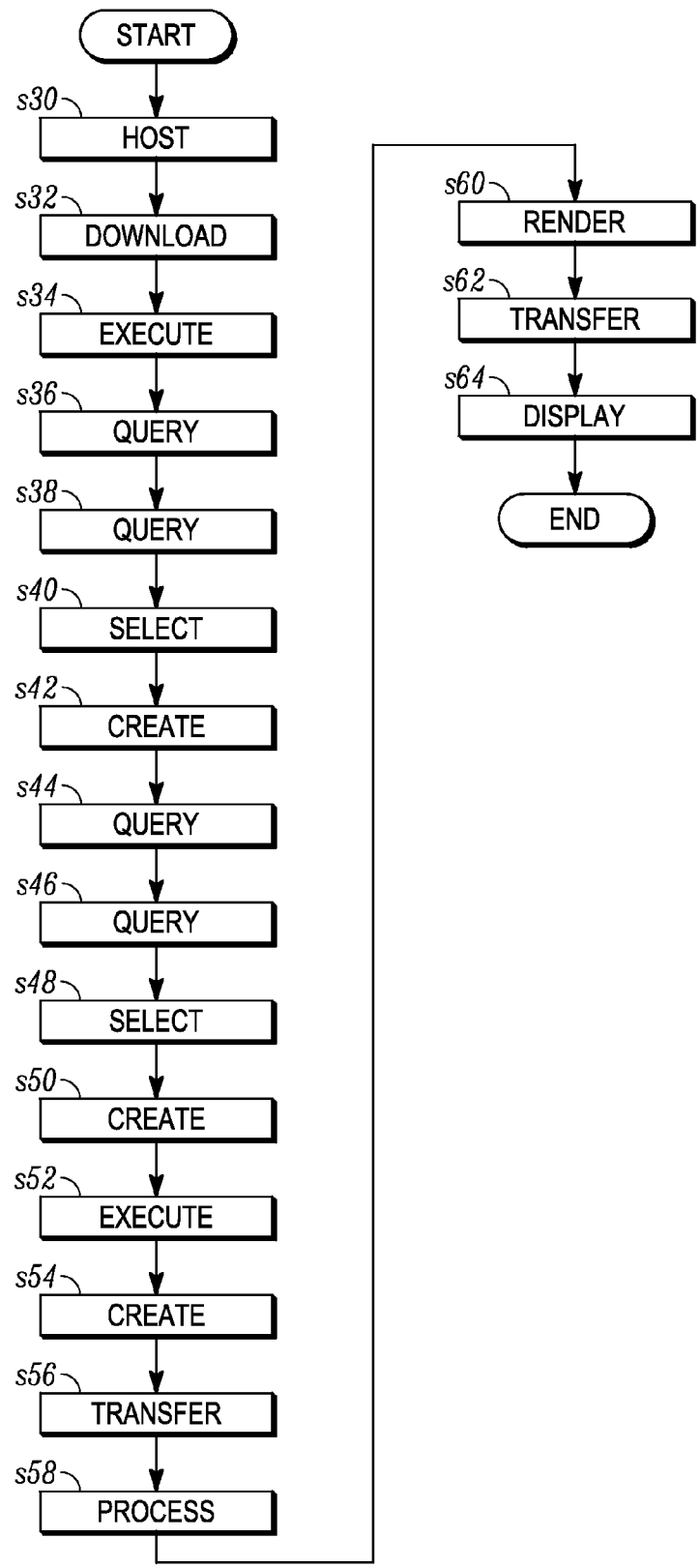
FIG. 9 is a process flowchart showing certain steps of a further process of displaying a web page.

FIG. 9 is a process flowchart showing certain steps of a further embodiment of a process by which the web page 14 may be displayed by the first computer 10.

In this embodiment, in addition to comprising WebCL commands 22, the JavaScript™ 20 of the web page 14 comprises WebGL commands (not shown in the figures). In other words, the JavaScript™ 20 of the web page 14 further comprises commands that have been specified using the WebGL framework. Further information about the WebGL framework or specification may be found, for example, in "WebGL Specification 1.0," which is incorporated herein by reference. Furthermore, in this embodiment, in addition to comprising the WebCL API 40, the web browser 28 comprises a WebGL API (not shown in the figures).

In other words, WebGL is supported by the web browser 28. The WebGL API is a JavaScript™ API for rendering interactive 3D graphics and 2D graphics. WebGL™ advantageously allows a GPU-accelerated usage of physics and image processing. WebGL™ may effect a part of a web-page canvas. Typically, WebGL™ computer programs comprise control code written in JavaScript™ and shader code that is executed on a computer's GPU.

Also, in this embodiment, the GPU 30, in addition to being an OpenCL™ device, is a "WebGL device" or "OpenGL" device (i.e., a device that may be controlled using functions or methods specified in the WebGL or OpenGL specifications). Further information on OpenGL may be found, for example, in "OpenGL Programming Guide, 7th edition," which is incorporated herein by reference.

At step s30, the first web server 4 hosts the web page 14.

At step s32, the first computer 10 accesses or downloads (via the Internet 8) the web page 14. The script 16 (including the JavaScript™ WebCL commands 22 and the JavaScript™ WebGL commands) and the image data 18 may be downloaded onto the first computer 10.

At step s34, the web browser 28 of the first computer 10 executes or runs the script 16 of the web page 14. The JavaScript™ module 36 of the web browser 28 may execute or run any JavaScript™ code 20 in the script 16. Also, the WebCL API 40 may execute or run any WebCL commands 22. Also, the WebGL API of the web browser 28 may execute or run any WebGL commands.

At step s36, when, or before, a WebGL command is encountered in the script 16, the script 16 being run by the web browser 28 may query whether the WebGL language is supported by the web browser 28. This querying may be performed by running any appropriate code or script or implementing any appropriate WebGL method.

In this embodiment, the WebGL API is installed on the web browser 28. In other words, WebGL language is supported by the web browser 28.

At step s38, after it has been determined that WebGL is supported by the web browser 28, the running of the script 16 by the web browser 28 may query what WebGL or OpenGL devices (i.e., what hardware accelerators or other processing devices or modules that may be operated or controlled using the WebGL or OpenGL programming languages) are available to the web browser 28. This querying may be performed by running any appropriate code or script, using any appropriate WebGL method. In this embodiment, the GPU 30 is identified as a WebGL or OpenGL device.

At step s40, the GPU 30 is selected as the WebGL or OpenGL device that is to process some or all of the web page data (e.g., is to render the image 18).

At step s42, the running of the script 16 (i.e., the Web GL commands) by the web browser 28 (and the WebGL API) creates a "WebGL context" in or for the GPU 30. A WebGL context may be an execution context in which WebGL or OpenGL programs or code may be run. A WebGL context may be used to provide a "link" or to allow communication between the GPU 30 and the web browser 28. The creation of a WebGL context on the GPU 30 may be performed by running any appropriate code or script, or by using any appropriate WebGL methods.

At step s44, when, or before, a WebCL command 22 is encountered in the script 16, the script 16 being run by the web browser 28 may query whether the WebCL language is supported by the web browser 28. This querying may be performed as described at step s8 of FIG. 7 above.

In this embodiment, the WebCL API 40 is installed on the web browser 28.

At step s46, after it has been determined that WebCL is supported by the web browser 28, the running of the script 16 by the web browser 28 may query what platform (i.e., operating platform, i.e., the type of the first computer 10) the web browser 28 is running on. It may also be queried what OpenCL™ devices (i.e., what hardware accelerators or other processing devices or modules that may be operated or controlled using the OpenCL™ programming language) are available to the web browser 28. This querying may be performed as described at step s10 of FIG. 7 above.

In this embodiment, the GPU 30 is identified as an OpenCL™ device.

At step s48, the GPU 30 is selected as the OpenCL™ device that is to process some or all of the web page data (e.g., data relating to the image 18).

At step s50, the running of the script 16 (i.e., the Web CL commands 22) by the web browser 28 (and the WebCL API 40) creates a WebCL context 50 in or for the GPU 30. The creation of the WebCL context 50 may be as described at step s14 of FIG. 7 above. In other embodiments, the WebCL context 50 may be created within the previously selected WebGL context (or vice versa). In such a case, the WebCL context may be thought of as a sub-context.

At step s52, the script 16 continues to be executed or run.

This running of the script 16 may comprise, when the web browser 28 (which may comprise the WebCL API 40) executes or runs a WebCL command 22, the web browser 28 (or WebCL API 40) calling a corresponding OpenCL™ function 33 (from the OpenCL™ library 32). The OpenCL™ function or method 33 called when a WebCL command 22 is executed may be the OpenCL™ function or method 33 for which that particular WebCL command 22 is a JavaScript™ binding. The called OpenCL™ functions 33 may be run or executed within the WebCL context 50 created within the GPU 30. Thus, in effect, OpenCL™ code may be run in the context of a WebCL environment within or for the GPU 30.

WebCL command queues may also be created to facilitate, organize, or manage the transfer of data from the web browser 28 (i.e., from the web browser's memory, i.e., the "host memory") to the GPU 30 (i.e., the OpenCL™ device memory), control execution of programs and kernels, synchronize events, etc. Code or methods that may be used to create command queues are provided below.

Also, the running of the script 16 may comprise, when the web browser 28 (which may comprise the WebGL API) executes or runs a WebGL command, the web browser 28 (or WebGL API) calling a corresponding OpenGL function, e.g., from an OpenGL library that may be part of the WebGL API or accessible by the WebGL API. The called OpenGL functions may be run or executed within the WebGL context created within the GPU 30.

WebGL command queues may also be create to facilitate, organize, or manage the transfer of data from the web browser 28 (i.e., from the web browser's memory, i.e., the "host memory") to the GPU 30 (i.e., the OpenCL™ device memory), control execution of programs and kernels, synchronize events, etc.

In this embodiment, the script 16 specifies that data corresponding to the image 18 are to be processed by the GPU 30 using both WebCL (or OpenCL™) and WebGL (or OpenGL) methods. For example, the script 16 may specify that the image data 18 are to be processed (using WebCL or OpenCL™) by the GPU 30 before being rendered using (using WebGL or OpenGL) by the GPU 30. Steps s54 to s62 describe how this may be performed.

At step s54, the running of the script 16 by the web browser 28 creates a memory object in which the image data 18 are to be placed. This memory object may be or comprise, or in some other way specify, an amount of GPU memory to be reserved for the image data 18. The created memory object may be a buffer. This buffer may be within both the WebCL context 50 and the WebGL context. In other words, the buffer into which the image data 18 are to be transferred is "shared" between the WebCL context 50 and the WebGL context. Thus, this buffer is hereinafter referred to as the "shared buffer."

Figure 10:
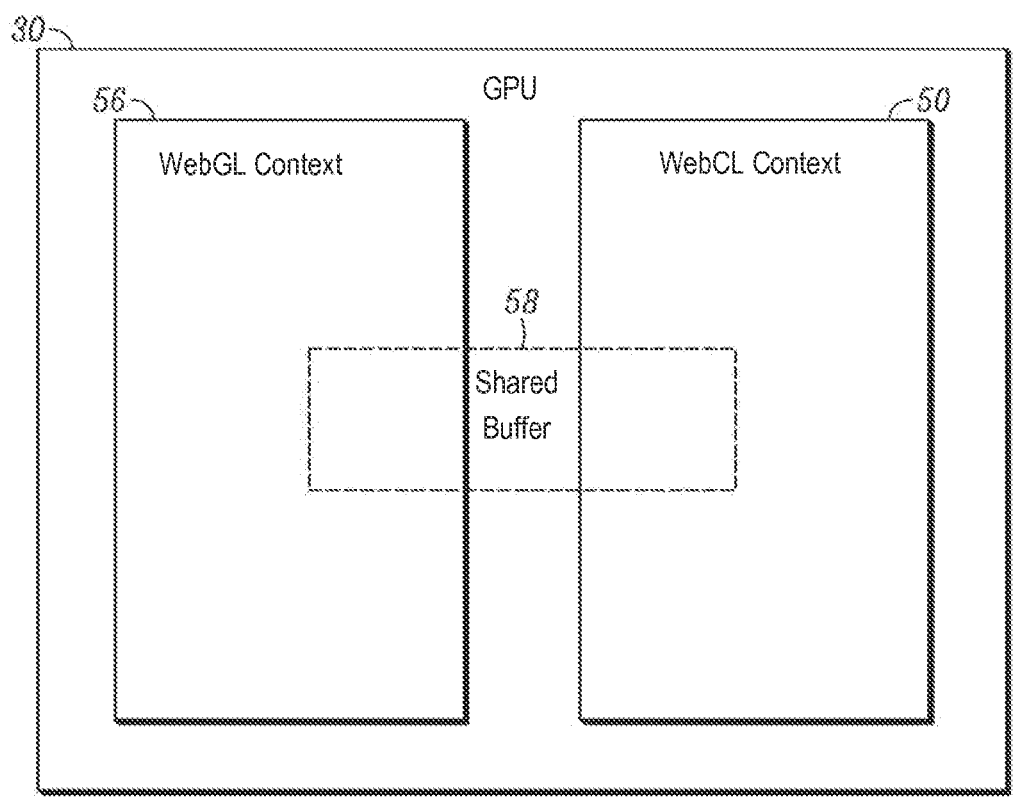
FIG. 10 is a schematic illustration (not to scale) of a graphical processing unit during the process of FIG. 9.

FIG. 10 is a schematic illustration (not to scale) of the GPU 30 at step s54. At step s54 the GPU 30 comprises the WebCL context 50, the WebGL context 56, and the shared buffer 58. The shared buffer 58 is shared between the WebCL context 50 and the WebGL context 56. In other words, data stored in the shared buffer 58 may be used, processed, modified, or updated by programs being executed in both the WebCL context 50 and the WebGL context 56.

The shared buffer 58 may be a buffer for containing general data or a buffer that may be optimized for containing image data (e.g., data relating to the image 18). The shared buffer may be a buffer configured to contain, e.g., either a JavaScript™ or untyped array or a typed array of data.

The sharing of the shared buffer 58 may be provided by any appropriate code or methods. In other words, the specification of the shared buffer 58 may be provided by any appropriate code or methods. Example code for providing such interoperability between WebCL and WebGL is provided below.

The shared buffer 58 may be configured to contain a typed array of data, e.g., as described above for the WebCL memory object 52.

At step s56, data (i.e., image data 18) are transferred, from the web browser 28, into the shared buffer 58 within the GPU 30. This transfer of data may be managed or performed using one or more command queues. A "write" command may be used to write the image data 18 into the shared buffer 58.

At step s58, the image data 18 transferred to the WebCL memory object 52 in the GPU 30 are processed by the GPU 30 using a WebCL or OpenCL™ program being executed in the WebCL context 50. By running the script 16, the web browser 28 may run WebCL commands 22 that may call OpenCL™ functions 33 that may be run in the WebCL context 50 by the GPU 30 to process the image data 18.

The processing of the image data 18 by the GPU 30 may be managed or performed using one or more command queues.

At step s60, the image data 18 processed using programs running in the WebCL context 50 may be rendered by the GPU 30 using a WebGL or OpenGL program being executed in the WebGL context 56. By running the script 16, the web browser 28 may run WebGL commands that may call OpenGL functions that may be run in the WebGL context 56 by the GPU 30 to render the processed image data 18 in the shared buffer 58.

Steps s58 and s60 may, for example, be iterated any number of times.

At step s62, the rendered image data 18 may be transferred back to the web browser 28.

The transfer of the image data 18 from the memory of the GPU 30 (i.e., the shared buffer 58) to the web browser 28 (i.e., the host memory) may be managed or performed using one or more command queues. A "read" command may be used by the web browser 28 to read processed image data 18 from the shared buffer 58.

At step s64, the web page 14 may be displayed by the web browser 28 on the display 34 of the first computer 10 (e.g., to a user of the first computer 10). Displaying the web page 14 may comprise displaying a rendered image that corresponds to or is specified by the processed and rendered image data 18.

Thus, a process by which the web page 14 may be displayed by the first computer 10 is provided.

A web-site developer may use WebCL commands 22 in accordance with or specified by the WebCL framework (methods and functions of which are provided below) to specify a web page. Advantageously, the WebCL framework may support "extensions" in a similar way to how extensions are supported by the OpenCL™ framework. Such extensions may also be used to specify a web page. An extension to a framework may relate to a capability (e.g., a new capability) of a device (e.g., the GPU 30) that may be optionally supported but is not a core capability of that framework. An extension to a framework may, for example, be represented as a class (or interface) that includes one or more methods or attributes. Extensions to the WebCL framework, i.e., WebCL extensions 26, may be specified, e.g., by users of the WebCL framework. A WebCL extension 26 may be a general extension to the WebCL framework. Alternatively, a WebCL extension 26 may be a "proprietary extension" that may be useable only by a certain piece of hardware (e.g., certain accelerator hardware, e.g., a specific CPU or GPU). A WebCL extension 26 may be made available to other users of the WebCL framework, for example, by storing that extension in a location (e.g., the repository 24) that is accessible to other users of the WebCL framework, such that those other users may retrieve, access, or use that WebCL extension 26.

Figure 11:
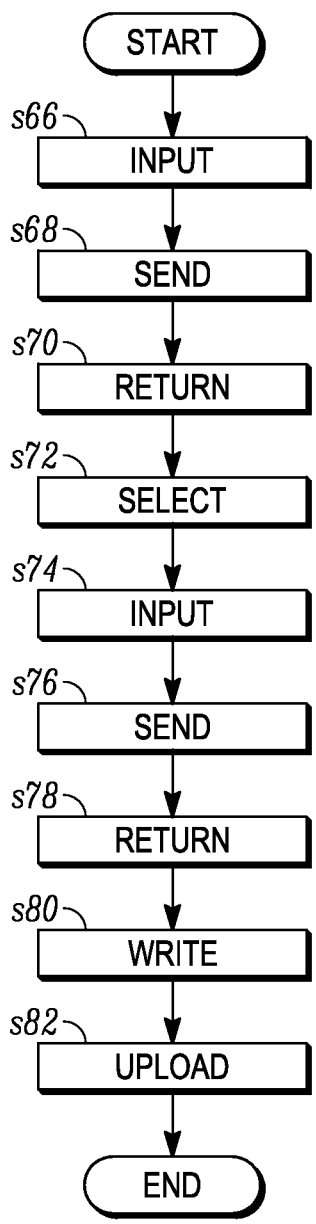
FIG. 11 is a process flowchart showing certain steps of a process of specifying a web page.

FIG. 11 is a process flowchart showing certain steps of an embodiment of a process by which the web page 14 may be specified. In other embodiment, this method may be used to specify other scripts, e.g., a script not to be used in a web page. This specification of the web page 14 comprises using the WebCL frame work and extensions thereto.

At step s66, a user of the second computer 12 inputs an instruction (e.g., by typing a command using the user interface 48) into the second computer 12. This instruction is an instruction to access or download a list of all WebCL extensions 26 that are available in the repository 24. This may, for example, be achieved by the user of the second computer 12 inputting into the second computer 12, using the user interface 48, the following command:

var extensions=device.getExtensions( )

At step s68, the instruction is sent from the second computer 12 (e.g., by the processing module 46) to the second web server 6 that hosts the repository 24.

At step s70, the second web server 6 receives the instruction and returns, to the second computer 12, a list of the WebCL extensions 26 that are available in the repository 24.

This returned list may, for example, be displayed to the user of the second computer 12 using the user interface 48.

At step s72, the user selects a WebCL extension 26 that he wishes to use in the specification of the web page 14. Examples of possible WebCL extensions are provided below.

At step s74, the user of the second computer 12 inputs an instruction (e.g., by typing a command using the user interface 48) into the second computer 12. This instruction is an instruction to access or download the selected WebCL extension 26 from the repository 24. This may, for example, be achieved by the user of the second computer 12 inputting into the second computer 12, using the user interface 48, the following command:

var extension_object=device.getExtension(extension_name)

where extension_name is the name of the WebCL extension 26 that the user of the second computer 12 wishes returned.

At step s76, the instruction is sent from the second computer 12 (e.g., by the processing module 46) to the second web server 6 that hosts the repository 24.

At step s78, the second web server 6 receives the instruction and returns, to the second computer 12, the selected WebCL extension 26.

At step s80, using methods, functions, parameters, etc., specified in the returned WebCL extension 26, the user of the second computer 12 may write the web page 14. This writing of the web page 14 may further comprise writing one or more WebCL commands 22 using the WebCL framework. This writing of the web page 14 may further comprise writing one or more WebGL commands using the WebGL framework. This writing of the web page 14 may further comprise writing other JavaScript™ commands or specifying other data (e.g., image data 18) for the web page 14.

At step s82, the completed (i.e., written) web page may be uploaded, from the second computer 12, onto the first web server 4. This may be so that the web page 14 may be accessed or downloaded via the Internet 8 (e.g., by the first computer 10 as described in more detail above with reference to FIGS. 7 and 9).

Thus, a process by which the web page 14 may be specified is provided.

Now described are methods, functions, etc., that may form the WebCL framework (i.e., methods, functions, etc., that may be used to write WebCL commands 22). This information will be useful in understanding the above described methods and apparatus.

The WebCL framework may be used for writing web pages, web applications, or computer programs that may be executed on the web browser 28 or any other device or application that is capable of downloading or accessing data via the Internet 8.

The WebCL framework provides a set of JavaScript™ bindings to the Khronos™ OpenCL™ framework for heterogeneous parallel computing. The JavaScript™ bindings to OpenCL™ may be thought of as wrapper code between the native code (i.e., OpenCL™) and JavaScript™ code. The JavaScript™ bindings may allow the native code (i.e., OpenCL™) to be called using JavaScript™ code and vice versa.

Similarly to the OpenCL™ framework, the WebCL framework comprises a plurality of document object model (DOM) interfaces. An interface may include one or more methods or one or more attributes that may be used when writing, e.g., a WebCL command 22 that forms part of a specification for a web page 14. Also, an instance of an interface is a class or object. Further information on DOM may be found, for example, in "Document Object Model Core: The DOMString Type," World Wide Web Consortium (W3C), which is incorporated herein by reference.

In this description, methods of the WebCL framework are specified using IDL or web-IDL. In other words, the first term in the definition of a method or function is the object or value that is returned by the method. The second part of the definition of a method is the function name, i.e., the function, of the method. The third part of the method (which is included in parentheses) is the set of parameters used by the function to return the return first term (i.e., the return object). For example:

ReturnObject getReturnObject(parameters)

means that, using the parameters "parameters," the function getReturnObject would return an object of the type ReturnObject. The specific object returned would depend on the specific parameters used.

A first interface of the WebCL framework is the WebCLMemory interface. The WebCLMemory interface may derive from (i.e., be a JavaScript™ binding of) the ArrayBuffer interface of OpenCL™. The WebCLMemory interface may be defined (in. as follows:

interface WebCLMemory: ArrayBuffer{ }

However, in other embodiments, this interface may have a different definition or an equivalent definition that is expressed differently.

A further interface of the WebCL framework is the ImageFormat interface. The ImageFormat interface may be an associative array with two keys, namely order and data_type. The ImageFormat interface may be defined as follows:

```
interface ImageFormat {
    order : int;
    data_type : int;
}
```

However, in other embodiments, this interface may have a different definition or an equivalent definition that is expressed differently.

A further interface of the WebCL framework is the WebCLMappedRegion interface. Some OpenCL™ methods, when implemented, return values as well as information that may be used to identify the one or more memory regions (e.g., a memory address) from which those values are returned. The WebCLMappedRegion interface of the WebCL framework advantageously tends to "hide" the identity of the memory regions from which values are returned. Thus, identifiers for the memory regions tend not to be returned to an application. Advantageously, this may oppose or prevent a malicious party from using the information that identifies a memory region to access parts of the memory of the computer 10. The WebCLMappedRegion interface may be defined as follows:

```
[Callback] interface WebCLMappedRegion {
    ArrayBuffer buffer; // data in mapped region, may be Undefined
    WebCLEvent event; // event that may be associated with this buffer, may be Undefined
};
```

However, in other embodiments, this interface may have a different definition or an equivalent definition that is expressed differently.

A further interface of the WebCL framework is the WebCL interface. The WebCL interface includes JavaScript™ bindings for the methods for general objects defined in the OpenCL™ framework. The WebCL interface may be defined as follows:

```
Callback] interface WebCL {
[Constructor] WebCL New( );
WebCLPlatform[ ] getPlatformIDs( );
WebCLPlatform[ ] getPlatformIDs( );
WebCLContext createContext(int properties[ ], WebCLDevice devices[ ]);
WebCLContext createContext(int properties[ ], int device_type);
void waitForEvents(WebCLEvent events[ ]);
void unloadCompiler( );
};
```

However, in other embodiments, this interface may have a different definition or an equivalent definition that is expressed differently.

The following list of methods includes methods that may be included in the WebCL interface and describes uses of those methods. Also, in the following list, for each parameter of the methods in the WebCL interface a default value is shown.

WebCL New( )

WebCLPlatform[ ] getPlatformIDs( )

WebCLContext createContext(int properties[ ], WebCLDevice devices[ ])

WebCLContext createContext(int properties[ ], int device_type)

void waitForEvents(WebCLEvent events[ ])

void unloadCompiler( )

A further interface of the WebCL framework is the WebCLCommandQueue interface. The WebCLCommandQueue interface includes JavaScript™ bindings for the OpenCL™ methods (defined in the OpenCL™ framework) that relate to command queues (e.g., methods for creating command queues, etc.). The WebCLCommandQueue interface may be defined as follows:

```
[Callback] interface WebCL {
[Constructor] WebCLCommandQueue New( );
Object getInfo(int name);
WebCLEvent enqueueNDRangeKernel(WebCLKernel kernel[ ],
int offsets[1..3], int globals[1..3], int locals[1..3],
WebCLEvent events[ ]=NULL);
WebCLEvent enqueueTask(WebCLKernel kernel, WebCLEvent events [ ] =
NULL);
WebCLEvent enqueueWriteBuffer(WebCLMemory buffer, boolean
blocking_write, int offset, int size, Array array, WebCLEvent
events[ ]=NULL);
WebCLEvent enqueueWriteBufferRect(WebCLMemory buffer, boolean
blocking_write, int buffer_offset[1..3],
int host_offset[1..3], int region[1..3],
int buffer_row_pitch, int buffer_slice_pitch, int
host_row_pitch, int host_slice_pitch,
Array array, WebCLEvent events[ ]=NULL);
WebCLEvent enqueueReadBuffer(WebCLMemory buffer, boolean
blocking_read, int offset, int size,
Array array, WebCLEvent events[ ]=NULL);
WebCLEvent enqueueReadBufferRect(WebCLMemory buffer, boolean
blocking_read, int buffer_offset[1..3],
int host_offset[1..3], int region[1..3], int buffer_row_pitch, int
buffer_slice_pitch,
int host_row_pitch, int host_slice_pitch,
Array array, WebCLEvent events[ ]=NULL);
WebCLEvent enqueueCopyBuffer(WebCLMemory src, WebCLMemory dst,
int
src_offset[1..3] , int dst_offset[1..
int size, WebCLEvent events [ ]=NULL);
WebCLEvent enqueueCopyBufferRect(WebCLMemory src, WebCLMemory
dst,
int src_origin[1..3], int dst_origin
int region[1..3], int src_row_pitch[1..3], int src_slice_pitch[1..3], int
dst_row_pitch[1..3],
int dst_slice_pitch[1..3], WebCLEvent events[ ]=NULL);
WebCLEvent enqueueReadImage(WebCLMemory buffer, boolean
blocking_read, int origin[1..3], int region[1..
int row_pitch, int slice_pitch, Array array, WebCLEvent events[ ]=NULL);
WebCLEvent enqueue WriteImage(WebCLMemory buffer, boolean
blocking_write, int origin[1..3], int region[1
int row_pitch, int slice_pitch, Array array, WebCLEvent events[ ]=NULL);
WebCLEvent enqueueCopyImage(WebCLMemory src, WebCLMemory dst,
int
src_origin[1..3], int dst_origin[1..3
int region[1..3], WebCLEvent events[ ]=NULL);
WebCLEvent enqueueCopyImageToBuffer(WebCLMemory src_image,
WebCLMemory dst_buffer, int src_origin[1..3]
int region[1..3], int dst_offset, WebCLEvent events[ ]=NULL);
WebCLEvent enqueueCopyBufferToImage(WebCLMemory src_buffer,
WebCLMemory dst_image, int src_offset,
int dst_origin[1..3], int region[1..3], WebCLEvent
events[ ]=NULL);
WebCLMappedRegion enqueueMapBuffer(WebCLMemory buffer, boolean
blocking_map, cl_map map_flags, int offs
int size, WebCLEvent events[ ]=NULL);
WebCLMappedRegion enqueueMapImage(WebCLMemory image, boolean
blocking_map, cl_map map_flags, int origin
int region[1..3], int row_pitch, int slice_pitch, WebCLEvent
events[ ]=NULL);
WebCLEvent enqueueUnmapMemObject(WebCLMemory memory,
WebCLMappedRegion mapped_region, WebCLEvent events
WebCLEvent enqueueMarker( );
WebCLEvent enqueueWaitForEvents(WebCLEvent events[ ]);
void enqueueBarrier( );
void finish( );
void flush( );
};
```

However, in other embodiments, this interface may have a different definition or an equivalent definition that is expressed differently.

In any or all of the methods described herein, e.g., the methods in the WebCLCommandQueue interface, an array object may, for example, be an untyped array buffer or a typed array buffer. For small buffers, it may be may preferable for an array object to be an untyped array buffer (e.g., an ECMAScript array), whereas for larger buffers it may be preferable for an array object to be a typed array (thereby avoiding a relatively large computational cost of converting data from ECMAScript VM space to native memory space).

The following list of methods includes methods that may be included in the WebCLCommandQueue interface and describes uses of those methods. Also, in the following list, for each parameter of the methods in the WebCLCommandQueue interface a default value is provided.

1. WebCLCommandQueue New( )
2. Object getInfo(int name)
This method returns a value for the input int name. The type of value returned is the "natural" type for the int name, as specified in the following table:

| int name | type of object returned |
| --- | --- |
| CL_QUEUE_CONTEXT | WebCLContext |
| CL_QUEUE_DEVICE | WebCLDevice |
| CL_QUEUE_REFERENCE_COUNT | Integer |
| CL_QUEUE_PROPERTIES | Integer |

3. WebCLEvent enqueueNDRangeKernel(WebCLKernel kernel[ ], int offsets[1 . . . 3], int globals[1 . . . 3], int locals[1 . . . 3], WebCLEvent events[ ]=NULL)
4. WebCLEvent enqueueTask(WebCLKernel kernel, WebCLEvent events[ ]=NULL)
5. WebCLEvent enqueueWriteBuffer(WebCLMemory buffer, boolean blocking_write, int offset, int size, Array array, WebCLEvent events[ ]=NULL)
6. WebCLEvent enqueueWriteBufferRect(WebCLMemory buffer, boolean blocking_write, int buffer_offset[1 . . . 3], int host_offset[1 . . . 3], int region[1 . . . 3], int buffer_row_pitch, int buffer_slice_pitch, int host_row_pitch, int host_slice_pitch, Array array, WebCLEvent events[ ]=NULL)
7. WebCLEvent enqueueReadBuffer(WebCLMemory buffer, boolean blocking_read, int offset, int size, WebCLMappedRegion region, WebCLEvent events[ ]=NULL)
8. WebCLEvent enqueueReadBufferRect(WebCLMemory buffer, boolean blocking_read, int buffer_offset[1 . . . 3], int host_offset[1 . . . 3], int region[1 . . . 3], int buffer_row_pitch, int buffer_slice_pitch, int host_row_pitch, int host_slice_pitch, Array array, WebCLEvent events[ ]=NULL)
9. WebCLEvent enqueueCopyBuffer(WebCLMemory src, WebCLMemory dst, int src_offset[1 . . . 3], int dst_offset [1 . . . 3], int size, WebCLEvent events[ ]=NULL)
10. WebCLEvent enqueueCopyBufferRect(WebCLMemory src, WebCLMemory dst, int src_origin[1 . . . 3], int dst_origin[1 . . . 3], int region[1 . . . 3], int src_row_pitch[1 . . . 3], int src_slice_pitch[1 . . . 3], int dst_row_pitch[1 . . . 3], int dst_slice_pitch[1 . . . 3], WebCLEvent events[ ]=NULL)
11. WebCLEvent enqueueReadImage(WebCLMemory buffer, boolean blocking_read, int origin[1 . . . 3], int region[1 . . . 3], int row_pitch, int slice_pitch, Array array, WebCLEvent events[ ]=NULL)
12. WebCLEvent enqueueWriteImage(WebCLMemory buffer, boolean blocking_write, int origin[1 . . . 3], int region[1 . . . 3], int row_pitch, int slice_pitch, Array array, WebCLEvent events[ ]=NULL)
13. WebCLEvent enqueueCopyImage(WebCLMemory src, WebCLMemory dst, int src_origin[1 . . . 3], int dst_origin[1 . . . 3], int region[1 . . . 3], WebCLEvent events[ ]=NULL)
14. WebCLEvent enqueueCopyImageToBuffer(WebCLMemory src_image, WebCLMemory dst_buffer, int src_origin[1 . . . 3], int region[1 . . . 3], int dst_offset, WebCLEvent events[ ]=NULL)
15. WebCLEvent enqueueCopyBufferToImage(WebCLMemory src_buffer, WebCLMemory dst_image, int src_offset, int dst_origin[1 . . . 3], int region[1 . . . 3], WebCLEvent events[ ]=NULL)
16. WebCLMappedRegion enqueueMapBuffer(WebCLMemory buffer, boolean blocking_map, cl_map map_flags, int offset, int size, WebCLEvent events[ ]=NULL)
17. WebCLMappedRegion enqueueMapImage(WebCLMemory image, boolean blocking_map, cl_map map_flags, int origin[1 . . . 3], int region[1 . . . 3], int row_pitch, int slice_pitch, WebCLEvent events[ ]=NULL)
18. WebCLEvent enqueueUnmapMemObject(WebCLMemory memory, WebCLMappedRegion mapped_region, WebCLEvent events[ ]=NULL)
19. WebCLEvent enqueueMarker( )
20. WebCLEvent enqueueWaitForEvents(WebCLEvent events[ ])
21. void enqueueBarrier( )
22. void finish( )
23. void flush( )

The above provided methods of the WebCLCommandQueue interface may be defined or implemented in a different way. For example, the WebCLCommandQueue interface may be implemented using associative arrays (e.g., as for the ImageFormat interface defined earlier above), i.e., as opposed to implementing the WebCLCommandQueue interface as a list of parameters. For example, instead of using a long list of arguments, as defined in the OpenCL™ 1.1 specification, the following further definition of the WebCLCommandQueue interface use an associative array "WebCLRegion" to specify an area being read or written within an ArrayBuffer/WebCLMemory:

```
[Callback] interface WebCL {
[Constructor] WebCLCommandQueue New( )
Object getInfo(int name);
WebCLEvent enqueueNDRangeKernel(WebCLKernel kernel[ ], int
offsets[1..3], int globals[1..3], int locals[1..3],
WebCLEvent event_wait_list[ ]=NULL);
WebCLEvent enqueueTask(WebCLKernel kernel, WebCLEvent events [ ] =
NULL);
WebCLEvent enqueueWriteBuffer(WebCLMemory buffer, boolean
blocking_write,
WebCLRegion array, int size, WebCLEvent event_wait_list[ ]=NULL);
WebCLEvent enqueueReadBuffer(WebCLMemory buffer, boolean
blocking_read,
WebCLRegion array, WebCLEvent event_wait_list[ ]=NULL);
WebCLEvent enqueueCopyBuffer(WebCLRegion src, WebCLRegion dst,
WebCLEvent event_wait_list[ ]=NULL);
WebCLEvent enqueueCopyImageToBuffer(WebCLRegion src_image,
WebCLMemory dst_buffer,
WebCLEvent event_wait_list[ ]=NULL);
```

-continued

```
WebCLEvent enqueueCopyBufferToImage(WebCLMemory src_buffer,
WebCLRegion dst_image,
WebCLEvent event_wait_list[ ]=NULL);
WebCLMappedRegion enqueueMapBuffer(WebCLRegion buffer, boolean
blocking_map, cl_map map_flags, WebCLEvent event_wait_list[ ]=NULL);
WebCLEvent enqueueUnmapMemObject(WebCLMemory memory,
WebCLMappedRegion mapped_region, WebCLEvent
event_wait_list[ ]=NULL);
WebCLEvent enqueueMarker( );
WebCLEvent enqueueWaitForEvents(WebCLEvent event_wait_list[ ]);
void enqueueBarrier( );
void finish( );
void flush( );
// WebGL interop. (this is a subset of OpenGL interop. extensions)
WebCLEvent enqueueAcquireGLObjects(WebCLMemory objects[ ],
WebCLEvent event_wait_list[ ]=NULL);
WebCLEvent enqueueReleaseGLObjects(WebCLMemory objects[ ],
WebCLEvent event_wait_list[ ]=NULL);
};
```

The following list of methods includes methods that may be included in the further WebCLCommandQueue interface and describes uses of those methods. In the following list, for each parameter of the methods in the WebCLCommandQueue interface a default value is provided. Also, in the following list, WebCLRegion specifies a memory region that may be used. This advantageously tends to simplify the number of methods in the WebCLCommandQueue object.
1. WebCLCommandQueue New( )
2. Object getInfo(int name)
3. WebCLEvent enqueueNDRangeKernel(WebCLKernel kernel[ ], int offsets[1 . . . 3], int globals[1 . . . 3], int locals[1 . . . 3], WebCLEvent event_wait_list[ ]=NULL)
4. WebCLEvent enqueueTask(WebCLKernel kernel, WebCLEvent event_wait_list[ ]=NULL)
5. WebCLEvent enqueueWriteBuffer(WebCLMemory buffer, boolean blocking_write, WebCLRegion array, int size, WebCLEvent event_wait_list[ ]=NULL)
6. WebCLEvent enqueueReadBuffer(WebCLMemory buffer, boolean blocking_read, WebCLRegion array, int size, WebCLEvent event_wait_list[ ]=NULL)
7. WebCLEvent enqueueCopyBuffer(WebCLRegion src, WebCLRegion dst, int size, WebCLEvent event_wait_list[ ]=NULL)
8. WebCLEvent enqueueCopyImageToBuffer(WebCLRegion src_image, WebCLMemory dst_buffer, WebCLEvent event_wait_list[ ]=NULL)
9. WebCLEvent enqueueCopyBufferToImage(WebCLMemory src_buffer, WebCLRegion dst_image, WebCLEvent event_wait_list[ ]=NULL)
10. WebCLMappedRegion enqueueMapBuffer(WebCLRegion buffer, boolean blocking_map, int map_flags, WebCLEvent event_wait_list[ ]=NULL)
11. WebCLEvent enqueueUnmapMemObject(WebCLMemory memory, WebCLMappedRegion mapped_region, WebCLEvent event_wait_list[ ]=NULL)
12. WebCLEvent enqueueMarker( )
13. WebCLEvent enqueueWaitForEvents(WebCLEvent event_wait_list[ ])
14. void enqueueBarrier( )
15. void finish( )
16. void flush( )
17. WebCLEvent enqueueAcquireGLObjects(WebCLMemory objects[ ], WebCLEvent event_wait_list[ ]=NULL)

This method may be used to acquire OpenCL™ memory objects that have been created from WebGL objects.

18. WebCLEvent enqueueReleaseGLObjects(WebCLMemory objects[ ], WebCLEvent event_wait_list[ ]=NULL)

This method may be used to release OpenCL™ memory objects that have been created from WebGL objects. These objects may be released before they can be used by OpenGL.

A further interface of the WebCL framework is the WebCLContext interface. The WebCLContext interface includes JavaScript™ bindings for the OpenCL™ methods relating to contexts (e.g., methods for creating contexts, etc). The WebCLContext interface may be defined as follows:

```
[Callback] interface WebCLContext {
[Constructor] WebCLContext New(int device_type, Object
properties [ ]);
Object getInfo(int name);
WebCLProgram createProgram(String source);
WebCLCommandQueue createCommandQueue(WebCLDevice device, int
properties [ ]);
WebCLMemory createBuffer(int flags, int size);
WebCLMemory createImage2D(int flags, ImageFormat format, int width,
int height, int row_pitch);
WebCLMemory createImage3D(int flags, ImageFormat format, int width,
int height, int depth, int row_pitc
WebCLSampler createSampler(boolean normalized_coords, int
addressing_mode, int filer_mode);
ImageFormat[ ] getSupportedImageFormats(int flags, int image_type);
WebCLEvent createUserEvent( );
};
```

However, in other embodiments, this interface may have a different definition or an equivalent definition that is expressed differently.

The following list of methods includes methods that may be included in the WebCLContext interface and describes uses of those methods. Also, in the following list, for each parameter of the methods in the WebCLContext interface a default value is provided.
1. WebCLContext New(int device_type, Object properties[ ])

Properties of this method may be as defined in the OpenCL™ framework. This method is used to create a WebCL context, e.g., the WebCL context 50.

2. Object getInfo(int name)

This method may return a value for int name. The type of value returned is the "natural" type for the requested int name, as specified in the following table:

| name | ECMAScript returned type |
|---|---|
| CL_CONTEXT_REFERENCE_COUNT | Integer |
| CL_CONTEXT_NUM_DEVICES | Integer |
| CL_CONTEXT_DEVICES | WebCLDevice[ ] |
| CL_CONTEXT_PROPERTIES | Integer[ ] |

3. WebCLProgram createProgram(String source)
This method may be used to create a WebCL Program from a UTF-8 string.
4. WebCLProgram createProgram(ArrayBuffer binary)
This method may be used to create a WebCL Program from a binary source.
5. WebCLCommandQueue createCommandQueue(WebCLDevice device, int properties[ ])
6. WebCLMemory createBuffer(int flags, int size)
This method is used to create the WebCL memory object 52 (i.e., WebCL memory buffer within the WebCL context 50).
7. WebCLMemory createImage2D(int flags, ImageFormat format, int width, int height, int row_pitch)
8. WebCLMemory createImage3D(int flags, ImageFormat format, int width, int height, int depth, int row_pitch, int slice_pitch)
9. WebCLSampler createSampler(boolean normalized_coords, int addressing_mode, int filer_mode)
10. ImageFormat[ ]getSupportedImageFormats(int flags, int image_type)
11. WebCLEvent createUserEvent( )

A further interface of the WebCL framework is the WebCLDevice interface. The WebCLDevice interface includes JavaScript™ bindings for the OpenCL™ methods relating to device objects (e.g., querying what WebCL or OpenCL™ devices are available, etc). The WebCLDevice interface may be defined as follows:

```
[Callback] interface WebCLDevice {
[Constructor] WebCLDevice New( )
Object getInfo(int name);
};
```

However, in other embodiments, this interface may have a different definition or an equivalent definition that is expressed differently.

The following list of methods includes methods that may be included in the WebCLDevice interface and describes uses of those methods. Also, in the following list, for each parameter of the methods in the WebCLDevice interface a default value is provided.
1. WebCLDevice New( )
2. getInfo(int name)
This method may return the value for the int name. The type of value returned is the "natural" type for the requested int name, as specified in the following table:

| int name | ECMAScript returned type |
|---|---|
| CL_DEVICE_TYPE | Integer |
| CL_DEVICE_MAX_COMPUTE_UNITS | Integer |
| CL_DEVICE_MAX_WORK_ITEM_DIMENSIONS | Integer |
| CL_DEVICE_MAX_WORK_ITEM_SIZES | Integer[3] |
| CL_DEVICE_MAX_WORK_GROUP_SIZE | Integer |
| CL_DEVICE_PREFERRED_VECTOR_WIDTH_CHAR | Integer |
| CL_DEVICE_PREFERRED_VECTOR_WIDTH_SHORT | |
| CL_DEVICE_PREFERRED_VECTOR_WIDTH_INT | |
| CL_DEVICE_PREFERRED_VECTOR_WIDTH_LONG | |
| CL_DEVICE_PREFERRED_VECTOR_WIDTH_FLOAT | |
| CL_DEVICE_PREFERRED_VECTOR_WIDTH_DOUBLE | |
| CL_DEVICE_PREFERRED_VECTOR_WIDTH_HALF | |
| CL_DEVICE_NATIVE_VECTOR_WIDTH_CHAR | |
| CL_DEVICE_NATIVE_VECTOR_WIDTH_SHORT | |
| CL_DEVICE_NATIVE_VECTOR_WIDTH_INT | |
| CL_DEVICE_NATIVE_VECTOR_WIDTH_LONG | |
| CL_DEVICE_NATIVE_VECTOR_WIDTH_FLOAT | |
| CL_DEVICE_NATIVE_VECTOR_WIDTH_DOUBLE | |
| CL_DEVICE_NATIVE_VECTOR_WIDTH_HALF | |
| CL_DEVICE_MAX_CLOCK_FREQUENCY | Integer |
| CL_DEVICE_ADDRESS_BITS | Integer |
| CL_DEVICE_MAX_MEM_ALLOC_SIZE | Integer |
| CL_DEVICE_IMAGE_SUPPORT | Boolean |
| CL_DEVICE_MAX_READ_IMAGE_ARGS | Integer |
| CL_DEVICE_MAX_WRITE_IMAGE_ARGS | Integer |
| CL_DEVICE_IMAGE2D_MAX_WIDTH | Integer |
| CL_DEVICE_IMAGE2D_MAX_HEIGHT | |
| CL_DEVICE_IMAGE3D_MAX_WIDTH | |
| CL_DEVICE_IMAGE3D_MAX_HEIGHT | |
| CL_DEVICE_IMAGE3D_MAX_DEPTH | |
| CL_DEVICE_MAX_SAMPLERS | Integer |
| CL_DEVICE_MAX_PARAMETER_SIZE | Integer |
| CL_DEVICE_MEM_BASE_ADDR_ALIGN | Integer |
| CL_DEVICE_MIN_DATA_TYPE_ALIGN_SIZE | Integer |
| CL_DEVICE_SINGLE_FP_CONFIG | Integer |
| CL_DEVICE_GLOBAL_MEM_CACHE_TYPE | Integer |
| CL_DEVICE_GLOBAL_MEM_CACHELINE_SIZE | Integer |
| CL_DEVICE_GLOBAL_MEM_CACHE_SIZE | Integer |
| CL_DEVICE_GLOBAL_MEM_SIZE | Integer |

| int name | ECMAScript returned type |
|---|---|
| CL_DEVICE_MAX_CONSTANT_BUFFER_SIZE | Integer |
| CL_DEVICE_MAX_CONSTANT_ARGS | Integer |
| CL_DEVICE_LOCAL_MEM_TYPE | Integer |
| CL_DEVICE_LOCAL_MEM_SIZE | Integer |
| CL_DEVICE_ERROR_CORRECTION_SUPPORT | Boolean |
| CL_DEVICE_HOST_UNIFIED_MEMORY | Boolean |
| CL_DEVICE_PROFILING_TIMER_RESOLUTION | Integer |
| CL_DEVICE_ENDIAN_LITTLE | Boolean |
| CL_DEVICE_AVAILABLE | Boolean |
| CL_DEVICE_COMPILER_AVAILABLE | Boolean |
| CL_DEVICE_EXECUTION_CAPABILITIES | Integer |
| CL_DEVICE_QUEUE_PROPERTIES | Integer |
| CL_DEVICE_PLATFORM | WebCLPlatform |
| CL_DEVICE_NAME | String |
| CL_DEVICE_VENDOR | |
| CL_DRIVER_VERSION | |
| CL_DEVICE_PROFILE | |

A further interface of the WebCL framework is the WebCLEvent interface. The WebCLEvent interface includes JavaScript™ bindings for the OpenCL™ methods relating to Event objects. Furthermore, the WebCLEvent interface includes JavaScript™ bindings for the methods for User-Event objects defined in the OpenCL™ framework. The WebCLEvent interface may be defined as follows:

```
[Callback] interface WebCLEvent {
[Constructor] WebCLEvent New( );
Object getInfo(int name);
Object getProfilingInfo(int name);
void setUserEventStatus(int status);
};
```

However, in other embodiments, this interface may have a different definition or an equivalent definition that is expressed differently.

The following list of methods includes methods that may be included in the WebCLEvent interface and describes uses of those methods. Also, in the following list, for each parameter of the methods in the WebCLEvent interface a default value is provided.

1. WebCLEvent New( )
2. Object getInfo(int name)
This method may return the value for the passed int name. The type of value returned is the "natural" type for the requested int name, as specified in the following table:

| int name | ECMAScript returned type |
|---|---|
| CL_EVENT_COMMAND_QUEUE | WebCLCommandQueue |
| CL_EVENT_CONTEXT | WebCLContext |
| CL_EVENT_COMMAND_TYPE | Integer |
| CL_EVENT_COMMAND_EXECUTION_STATUS | Integer |
| CL_EVENT_REFERENCE_COUNT | Integer |

3. Object getProfilingInfo(int name)
This method may return the value for the passed int name. The type of value returned is the "natural" type for the requested int name, as specified in the following table:

| int name | ECMAScript returned type |
|---|---|
| CL_PROFILING_COMMAND_QUEUED | Integer |
| CL_PROFILING_COMMAND_SUBMIT | Integer |
| CL_PROFILING_COMMAND_START | Integer |
| CL_PROFILING_COMMAND_END | Integer |

Alternatively, this method may return a "generic object" depending upon the name queried.

4. void setUserEventStatus(int status)

A further interface of the WebCL framework is the WebCLKernel interface. The WebCLKernel interface includes JavaScript™ bindings for the OpenCL™ methods related to Kernel objects. The WebCLKernel interface may be defined as follows:

```
[Callback] interface WebCLKernel {
[Constructor] WebCLKernel New( );
Object getInfo(int name);
Object getWorkgroupInfo(int name);
void setArg(int index, Object value);
};
```

However, in other embodiments, this interface may have a different definition or an equivalent definition that is expressed differently.

The following list of methods includes methods that may be included in the WebCLKernel interface and describes uses of those methods. Also, in the following list, for each parameter of the methods in the WebCLKernel interface a default value is provided.

1. WebCLKernel New( )

2. Object getInfo(int name)

This method may return the value for the passed int name. The type of value returned is the "natural" type for the requested int name, as specified in the following table:

| int name | ECMAScript returned type |
| --- | --- |
| CL_KERNEL_FUNCTION_NAME | String |
| CL_KERNEL_NUM_ARGS | Integer |
| CL_KERNEL_REFERENCE_COUNT | Integer |
| CL_KERNEL_CONTEXT | WebCLContext |
| CL_KERNEL_PROGRAM | WebCLProgram |

3. Object getWorkgroupInfo(int name)

This method may return an Integer or Integer[1 . . . 3] depending on the name queried.

4. void setArg(int index, Object value)

In this embodiment, depending on the argument being set, the exact native data type of value is not inferred from JavaScript™. Also, it is typically not known if an argument is _global or _local, without inspection of the kernel method's code. A user (e.g., a software developer) may be facilitated to specify a data type of the argument of this method. This may be done by using bitfield value, which may be called "type." In some embodiments, the data types of the arguments described by using this type value are defined in OpenCL™ 1.1 Specification, Table 6.1 (scalar types), Table 6.2 (vector/array types), and Table 6.4 (reserved data types), which are hereby incorporated by reference in their entirety. Table 6.3 of the OpenCL™ 1.1 Specification (also incorporated herein by reference) defines WebCLObjects data types such as image2D, image3D, sampler, and event, which are WebCLMemory objects, WebCLSampler or WebCLEvent, respectively. The data types of the arguments described by the type value (webcl.Type) may be as provided in the following table:

| webcl.Type | Value | Description |
| --- | --- | --- |
| is __local | 1<<0 | __local or __global argument |
| is | 1<<1 | A pointer type |
| is unsigned | 1<<2 | unsigned type |
| is memory object | 1<<3 | A WebCLMemory/WebCLSampler/WebCLEvent object |
| is complex | 1<<4 | A complex value |
| is imaginary | 1<<5 | an imaginary value |
| bool | 1<<8 | A boolean value |
| char | 1<<9 | an 8-bit integer value |
| short | 1<<10 | A 16-bit integer value |
| int | 1<<11 | A 32-bit integer value |
| long | 1<<12 | A 64-bit integer value |
| float | 1<<13 | A 32-bit IEEE 754 floating-point value |
| half float | 1<<14 | A 16-bit IEEE 754-2008 floating-point value |
| double | 1<<15 | A double-precision floating-point value |
| quad | 1<<16 | A 128-bit floating-point value |
| long long | 1<<17 | A 128-bit integer value |
| 2 | 1<<20 | A 2-value vector |
| 3 | 1<<21 | A 3-value vector |
| 4 | 1<<22 | A 4-value vector |
| 8 | 1<<23 | A 8-value vector |
| 16 | 1<<24 | A 16-value vector |
| 2xn | 1<<25 | A 2xn-value matrix |
| 3xn | 1<<26 | A 3xn-value matrix |
| 4xn | 1<<27 | A 4xn-value matrix |
| 8xn | 1<<28 | A 8xn-value matrix |
| 16xn | 1<<29 | A 16xn-value matrix |

Where i<<j means i "left shifted" by j.

A further interface of the WebCL framework is the WebCLMemory interface. The WebCLMemory interface includes JavaScript™ bindings for the methods related to memory objects defined in the OpenCL™ framework (e.g., methods for creating memory objects, etc.). As described in more detail above, when using the WebCL framework, a memory object (e.g., the WebCL memory object 52) may be a typed array. Further information on Typed Arrays may be found, for example, in "Typed Array Specification: Editor's Draft," July, 2012, which is incorporated herein by reference. The WebCLMemory interface may be defined as follows:

```
[Callback] interface WebCLMemory {
[Constructor] WebCLMemory New( );
Object getInfo(int name);
Object getImageInfo(int name);
WebCLMemory createSubBuffer(int flags, int type, Object region);
};
```

However, in other embodiments, this interface may have a different definition or an equivalent definition that is expressed differently.

The following list of methods includes methods that may be included in the WebCLMemory interface and describes uses of those methods. Also, in the following list, for each parameter of the methods in the WebCLMemory interface a default value is provided.

1. WebCLMemory New( )

2. Object getInfo(int name)

This method may return the value for int name. The type of value returned is the "natural" type for the requested int name, as specified in the following table:

| int name | ECMAScript returned type |
| --- | --- |
| CL_MEM_TYPE | Integer |
| CL_MEM_FLAGS | Integer |
| CL_MEM_SIZE | Integer |
| CL_MEM_HOST_PTR | ArrayBuffer |
| CL_MEM_MAP_COUNT | Integer |
| CL_MEM_REFERENCE_COUNT | Integer |
| CL_MEM_CONTEXT | WebCLContext |
| CL_MEM_ASSOCIATED_MEMOBJECT | WebCLMemory |
| CL_MEM_OFFSET | Integer |

4. WebCLMemory createSubBuffer(int flags, int type, Object region)

In this method, the region object may be an associative array {origin: int, size: int} and may be valid for CL_BUFFER_CREATE_TYPE_REGION type. This method may create a sub-buffer from an existing buffer.

A further interface of the WebCL framework is the WebCLPlatform interface. The WebCLPlatform interface includes JavaScript™ bindings for the OpenCL™ methods relating to platform objects (e.g., querying what platform or platform type the script is being run on). The WebCLPlatform interface may be defined as follows:

```
[Callback] interface WebCLPlatform {
[Constructor] WebCLPlatform New( );
Object getInfo(int name);
WebCLDevice[ ] getDevices(int device_type);
};
```

However, in other embodiments, this interface may have a different definition or an equivalent definition that is expressed differently.

The following list of methods includes methods that may be included in the WebCLPlatform interface and describes uses of those methods. Also, in the following list, for each parameter of the methods in the WebCLPlatform interface a default value is provided.

1. WebCLPlatform New( )
2. Object getInfo(int name)

This method may return the value for int name. The type of value returned is the "natural" type for the requested int name, as specified in the following table:

| name | ECMAScript returned type |
| --- | --- |
| CL_PLATFORM_PROFILE | String |
| CL_PLATFORM_VERSION | String |
| CL_PLATFORM_NAME | String |
| CL_PLATFORM_VENDOR | String |
| CL_PLATFORM_EXTENSIONS | String |

3. WebCLDevice[ ] getDevices(int device_type)

A further interface of the WebCL framework is the WebCLProgram interface. The WebCLProgram interface includes JavaScript™ bindings for the OpenCL™ methods relating to Program objects. The WebCLProgram interface may be defined as follows:

```
[Callback] interface WebCLProgram {
[Constructor] WebCLProgram New(String source);
[Constructor] WebCLProgram New(ArrayBuffer binary);
Object getInfo(int name);
Object getBuildInfo(WebCLDevice device, int name);
void build(WebCLDevice devices[ ], String options);
WebCLKernel createKernel(String name);
};
```

However, in other embodiments, this interface may have a different definition or an equivalent definition that is expressed differently.

The following list of methods includes methods that may be included in the WebCLProgram interface and describes uses of those methods. Also, in the following list, for each parameter of the methods in the WebCLProgram interface a default value is provided.

1. WebCLProgram New(String source)
2. WebCLProgram New(ArrayBuffer binary)
3. Object getInfo(int name)

This method may return the value for int name. The type of value returned is the "natural" type for the requested int name, as specified in the following table:

| Name | ECMAScript returned type |
| --- | --- |
| CL_PROGRAM_REFERENCE_COUNT | Integer |
| CL_PROGRAM_CONTEXT | WebCLContext |
| CL_PROGRAM_NUM_DEVICES | Integer |
| CL_PROGRAM_DEVICES | WebCLDevice |
| CL_PROGRAM_SOURCE | String |
| CL_PROGRAM_BINARY_SIZES | Integer[ ] |
| CL_PROGRAM_BINARIES[ ] | ArrayBuffer[ ] |

4. Object getBuildInfo(WebCLDevice device, int name)

This method returns Integer or String values depending on the name queried.

5. void build(WebCLDevice devices[ ], String options=NULL)
6. WebCLKernel createKernel(String name)

A further interface of the WebCL framework is the WebCLSampler interface. The WebCLSampler interface includes JavaScript™ bindings for the OpenCL™ methods for Sampler objects. The WebCLSampler interface may be defined as follows:

```
[Callback] interface WebCLSampler {
[Constructor] WebCLSampler New( );
Object getInfo(int name);
};
```

However, in other embodiments, this interface may have a different definition or an equivalent definition that is expressed differently.

The following list of methods includes methods that may be included in the WebCLSampler interface and describes uses of those methods. Also, in the following list, for each parameter of the methods in the WebCLSampler interface a default value is provided.

1. WebCLSampler New( )
2. Object getInfo(int name)

This method may return the value for int name. The type of value returned is the "natural" type for the requested int name, as specified in the following table:

| int name | ECMAScript returned type |
| --- | --- |
| CL_SAMPLER_REFERENCE_COUNT | Integer |
| CL_SAMPLER_CONTEXT | WebCLContext |
| CL_SAMPLER_NORMALIZED_COORDS | Boolean |
| CL_SAMPLER_ADDRESSING_MODE | Integer |
| CL_SAMPLER_FILTER_MODE | Integer |

The WebCL framework may include a plurality of constant values or constants. In some embodiments, the constants of the WebCL framework may be the same as those defined in the OpenCL™ framework (including optional extensions). However, in other embodiments, one or more of the constants of the WebCL framework may be different from defined in the OpenCL™ framework. For completeness, the constants of the WebCL framework in this embodiment are as follows:

```
namespace webcl {
/* Error Codes */
CL_SUCCESS =0;
CL_DEVICE_NOT_FOUND =-1;
CL_DEVICE_NOT_AVAILABLE =-2;
```

CL_COMPILER_NOT_AVAILABLE =-3;
CL_MEM_OBJECT_ALLOCATION_FAILURE =-4;
CL_OUT_OF_RESOURCES =-5;
CL_OUT_OF_HOST_MEMORY =-6;
CL_PROFILING_INFO_NOT_AVAILABLE =-7;
CL_MEM_COPY_OVERLAP =-8;
CL_IMAGE_FORMAT_MISMATCH =-9;
CL_IMAGE_FORMAT_NOT_SUPPORTED =-10;
CL_BUILD_PROGRAM_FAILURE =-11;
CL_MAP_FAILURE =-12;
CL_MISALIGNED_SUB_BUFFER_OFFSET -13;
CL_EXEC_STATUS_ERROR_FOR_EVENTS_IN_WAIT_LIST =-14;
CL_INVALID_VALUE =-30;
CL_INVALID_DEVICE_TYPE =-31;
CL_INVALID_PLATFORM =-32;
CL_INVALID_DEVICE =-33;
CL_INVALID_CONTEXT =-34;
CL_INVALID_QUEUE_PROPERTIES =-35;
CL_INVALID_COMMAND_QUEUE =-36;
CL_INVALID_HOST_PTR =-37;
CL_INVALID_MEM_OBJECT =-38;
CL_INVALID_IMAGE_FORMAT_DESCRIPTOR =-39;
CL_INVALID_IMAGE_SIZE =-40;
CL_INVALID_SAMPLER =-41;
CL_INVALID_BINARY =-42;
CL_INVALID_BUILD_OPTIONS =-43;
CL_INVALID_PROGRAM =-44;
CL_INVALID_PROGRAM_EXECUTABLE =-45;
CL_INVALID_KERNEL_NAME =-46;

CL_INVALID_KERNEL_DEFINITION =-47;

CL_INVALID_KERNEL =-48;

CL_INVALID_ARG_INDEX =-49;

CL_INVALID_ARG_VALUE =-50;

CL_INVALID_ARG_SIZE =-51;

CL_INVALID_KERNEL_ARGS =-52;

CL_INVALID_WORK_DIMENSION =-53;

CL_INVALID_WORK_GROUP_SIZE =-54;

CL_INVALID_WORK_ITEM_SIZE =-55;

CL_INVALID_GLOBAL_OFFSET =-56;

CL_INVALID_EVENT_WAIT_LIST =-57;

CL_INVALID_EVENT =-58;

CL_INVALID_OPERATION =-59;

CL_INVALID_GL_OBJECT =-60;

CL_INVALID_BUFFER_SIZE =-61;

CL_INVALID_MIP_LEVEL =-62;

CL_INVALID_GLOBAL_WORK_SIZE =-63;

CL_INVALID_PROPERTY =-64;

/* OpenCL(TM) Version */

CL_VERSION_1_0 =1;

CL_VERSION_1_1 =1;

/* cl_bool */

CL_FALSE =0;

CL_TRUE =1;

/* cl_platform_info */

CL_PLATFORM_PROFILE =0x0900;

CL_PLATFORM_VERSION =0x0901;

CL_PLATFORM_NAME =0x0902;

CL_PLATFORM_VENDOR =0x0903;

```
CL_PLATFORM_EXTENSIONS =0x0904;
/* cl_device_type - bitfield */
CL_DEVICE_TYPE_DEFAULT =(1 << 0);
CL_DEVICE_TYPE_CPU =(1 << 1);
CL_DEVICE_TYPE_GPU =(1 << 2);
CL_DEVICE_TYPE_ACCELERATOR =(1 << 3);
CL_DEVICE_TYPE_ALL =0xFFFFFFFF;
/* cl_device_info */
CL_DEVICE_TYPE =0x1000;
CL_DEVICE_VENDOR_ID =0x1001;
CL_DEVICE_MAX_COMPUTE_UNITS =0x1002;
CL_DEVICE_MAX_WORK_ITEM_DIMENSIONS =0x1003;
CL_DEVICE_MAX_WORK_GROUP_SIZE =0x1004;
CL_DEVICE_MAX_WORK_ITEM_SIZES =0x1005;
CL_DEVICE_PREFERRED_VECTOR_WIDTH_CHAR =0x1006;
CL_DEVICE_PREFERRED_VECTOR_WIDTH_SHORT =0x1007;
CL_DEVICE_PREFERRED_VECTOR_WIDTH_INT =0x1008;
CL_DEVICE_PREFERRED_VECTOR_WIDTH_LONG =0x1009;
CL_DEVICE_PREFERRED_VECTOR_WIDTH_FLOAT =0x100A;
CL_DEVICE_PREFERRED_VECTOR_WIDTH_DOUBLE =0x100B;
CL_DEVICE_MAX_CLOCK_FREQUENCY =0x100C;
CL_DEVICE_ADDRESS_BITS =0x100D;
CL_DEVICE_MAX_READ_IMAGE_ARGS =0x100E;
CL_DEVICE_MAX_WRITE_IMAGE_ARGS =0x100F;
CL_DEVICE_MAX_MEM_ALLOC_SIZE =0x1010;
CL_DEVICE_IMAGE2D_MAX_WIDTH =0x1011;
CL_DEVICE_IMAGE2D_MAX_HEIGHT =0x1012;
CL_DEVICE_IMAGE3D_MAX_WIDTH =0x1013;
CL_DEVICE_IMAGE3D_MAX_HEIGHT =0x1014;
```

CL_DEVICE_IMAGE3D_MAX_DEPTH =0x1015;
CL_DEVICE_IMAGE_SUPPORT =0x1016;
CL_DEVICE_MAX_PARAMETER_SIZE =0x1017;
CL_DEVICE_MAX_SAMPLERS =0x1018;
CL_DEVICE_MEM_BASE_ADDR_ALIGN =0x1019;
CL_DEVICE_MIN_DATA_TYPE_ALIGN_SIZE =0x101A;
CL_DEVICE_SINGLE_FP_CONFIG =0x101B;
CL_DEVICE_GLOBAL_MEM_CACHE_TYPE =0x101C;
CL_DEVICE_GLOBAL_MEM_CACHELINE_SIZE =0x101D;
CL_DEVICE_GLOBAL_MEM_CACHE_SIZE =0x101E;
CL_DEVICE_GLOBAL_MEM_SIZE =0x101F;
CL_DEVICE_MAX_CONSTANT_BUFFER_SIZE =0x1020;
CL_DEVICE_MAX_CONSTANT_ARGS =0x1021;
CL_DEVICE_LOCAL_MEM_TYPE =0x1022;
CL_DEVICE_LOCAL_MEM_SIZE =0x1023;
CL_DEVICE_ERROR_CORRECTION_SUPPORT =0x1024;
CL_DEVICE_PROFILING_TIMER_RESOLUTION =0x1025;
CL_DEVICE_ENDIAN_LITTLE =0x1026;
CL_DEVICE_AVAILABLE =0x1027;
CL_DEVICE_COMPILER_AVAILABLE =0x1028;
CL_DEVICE_EXECUTION_CAPABILITIES =0x1029;
CL_DEVICE_QUEUE_PROPERTIES =0x102A;
CL_DEVICE_NAME =0x102B;
CL_DEVICE_VENDOR =0x102C;
CL_DRIVER_VERSION =0x102D;
CL_DEVICE_PROFILE =0x102E;
CL_DEVICE_VERSION =0x102F;
CL_DEVICE_EXTENSIONS =0x1030;
CL_DEVICE_PLATFORM =0x1031;

```
CL_DEVICE_DOUBLE_FP_CONFIG =0x1032;
CL_DEVICE_HALF_FP_CONFIG =0x1033;
CL_DEVICE_PREFERRED_VECTOR_WIDTH_HALF =0x1034;
CL_DEVICE_HOST_UNIFIED_MEMORY =0x1035;
CL_DEVICE_NATIVE_VECTOR_WIDTH_CHAR =0x1036;
CL_DEVICE_NATIVE_VECTOR_WIDTH_SHORT =0x1037;
CL_DEVICE_NATIVE_VECTOR_WIDTH_INT =0x1038;
CL_DEVICE_NATIVE_VECTOR_WIDTH_LONG =0x1039;
CL_DEVICE_NATIVE_VECTOR_WIDTH_FLOAT =0x103A;
CL_DEVICE_NATIVE_VECTOR_WIDTH_DOUBLE =0x103B;
CL_DEVICE_NATIVE_VECTOR_WIDTH_HALF =0x103C;
CL_DEVICE_OPENCL(TM)_C_VERSION =0x103D;
/* cl_device_fp_config - bitfield */
CL_FP_DENORM =(1 << 0);
CL_FP_INF_NAN =(1 << 1);
CL_FP_ROUND_TO_NEAREST =(1 << 2);
CL_FP_ROUND_TO_ZERO =(1 << 3);
CL_FP_ROUND_TO_INF =(1 << 4);
CL_FP_FMA =(1 << 5);
CL_FP_SOFT_FLOAT =(1 << 6);
/* cl_device_mem_cache_type */
CL_NONE =0x0;
CL_READ_ONLY_CACHE =0x1;
CL_READ_WRITE_CACHE =0x2;
/* cl_device_local_mem_type */
CL_LOCAL =0x1;
CL_GLOBAL =0x2;
/* cl_device_exec_capabilities - bitfield */
CL_EXEC_KERNEL =(1 << 0);
```

CL_EXEC_NATIVE_KERNEL =(1 << 1);

/* cl_command_queue_properties - bitfield */

CL_QUEUE_OUT_OF_ORDER_EXEC_MODE_ENABLE =(1 << 0);

CL_QUEUE_PROFILING_ENABLE =(1 << 1);

/* cl_context_info */

CL_CONTEXT_REFERENCE_COUNT =0x1080;

CL_CONTEXT_DEVICES =0x1081;

CL_CONTEXT_PROPERTIES =0x1082;

CL_CONTEXT_NUM_DEVICES =0x1083;

/* cl_context_info + cl_context_properties */

CL_CONTEXT_PLATFORM =0x1084;

/* cl_command_queue_info */

CL_QUEUE_CONTEXT =0x1090;

CL_QUEUE_DEVICE =0x1091;

CL_QUEUE_REFERENCE_COUNT =0x1092;

CL_QUEUE_PROPERTIES =0x1093;

/* cl_mem_flags - bitfield */

CL_MEM_READ_WRITE =(1 << 0);

CL_MEM_WRITE_ONLY =(1 << 1);

CL_MEM_READ_ONLY =(1 << 2);

CL_MEM_USE_HOST_PTR =(1 << 3);

CL_MEM_ALLOC_HOST_PTR =(1 << 4);

CL_MEM_COPY_HOST_PTR =(1 << 5);

/* cl_channel_order */

CL_R =0x10B0;

CL_A =0x10B1;

CL_RG =0x10B2;

CL_RA =0x10B3;

CL_RGB =0x10B4;

CL_RGBA =0x10B5;
CL_BGRA =0x10B6;
CL_ARGB =0x10B7;
CL_INTENSITY =0x10B8;
CL_LUMINANCE =0x10B9;
CL_Rx =0x10BA;
CL_RGx =0x10BB;
CL_RGBx =0x10BC;
/* cl_channel_type */
CL_SNORM_INT8 =0x10D0;
CL_SNORM_INT16 =0x10D1;
CL_UNORM_INT8 =0x10D2;
CL_UNORM_INT16 =0x10D3;
CL_UNORM_SHORT_565 =0x10D4;
CL_UNORM_SHORT_555 =0x10D5;
CL_UNORM_INT_101010 =0x10D6;
CL_SIGNED_INT8 =0x10D7;
CL_SIGNED_INT16 =0x10D8;
CL_SIGNED_INT32 =0x10D9;
CL_UNSIGNED_INT8 =0x10DA;
CL_UNSIGNED_INT16 =0x10DB;
CL_UNSIGNED_INT32 =0x10DC;
CL_HALF_FLOAT =0x10DD;
CL_FLOAT =0x10DE;
/* cl_mem_object_type */
CL_MEM_OBJECT_BUFFER =0x10F0;
CL_MEM_OBJECT_IMAGE2D =0x10F1;
CL_MEM_OBJECT_IMAGE3D =0x10F2;
/* cl_mem_info */

CL_MEM_TYPE =0x1100;

CL_MEM_FLAGS =0x1101;

CL_MEM_SIZE =0x1102;

CL_MEM_HOST_PTR =0x1103;

CL_MEM_MAP_COUNT =0x1104;

CL_MEM_REFERENCE_COUNT =0x1105;

CL_MEM_CONTEXT =0x1106;

CL_MEM_ASSOCIATED_MEMOBJECT =0x1107;

CL_MEM_OFFSET =0x1108;

/* cl_image_info */

CL_IMAGE_FORMAT =0x1110;

CL_IMAGE_ELEMENT_SIZE =0x1111;

CL_IMAGE_ROW_PITCH =0x1112;

CL_IMAGE_SLICE_PITCH =0x1113;

CL_IMAGE_WIDTH =0x1114;

CL_IMAGE_HEIGHT =0x1115;

CL_IMAGE_DEPTH =0x1116;

/* cl_addressing_mode */

CL_ADDRESS_NONE =0x1130;

CL_ADDRESS_CLAMP_TO_EDGE =0x1131;

CL_ADDRESS_CLAMP =0x1132;

CL_ADDRESS_REPEAT =0x1133;

CL_ADDRESS_MIRRORED_REPEAT =0x1134;

/* cl_filter_mode */

CL_FILTER_NEAREST =0x1140;

CL_FILTER_LINEAR =0x1141;

/* cl_sampler_info */

CL_SAMPLER_REFERENCE_COUNT =0x1150;

CL_SAMPLER_CONTEXT =0x1151;

CL_SAMPLER_NORMALIZED_COORDS =0x1152;

CL_SAMPLER_ADDRESSING_MODE =0x1153;

CL_SAMPLER_FILTER_MODE =0x1154;

/* cl_map_flags - bitfield */

CL_MAP_READ =(1 << 0);

CL_MAP_WRITE =(1 << 1);

/* cl_program_info */

CL_PROGRAM_REFERENCE_COUNT =0x1160;

CL_PROGRAM_CONTEXT =0x1161;

CL_PROGRAM_NUM_DEVICES =0x1162;

CL_PROGRAM_DEVICES =0x1163;

CL_PROGRAM_SOURCE =0x1164;

CL_PROGRAM_BINARY_SIZES =0x1165;

CL_PROGRAM_BINARIES =0x1166;

/* cl_program_build_info */

CL_PROGRAM_BUILD_STATUS =0x1181;

CL_PROGRAM_BUILD_OPTIONS =0x1182;

CL_PROGRAM_BUILD_LOG =0x1183;

/* cl_build_status */

CL_BUILD_SUCCESS =0;

CL_BUILD_NONE =1;

CL_BUILD_ERROR =-2;

CL_BUILD_IN_PROGRESS =-3;

/* cl_kernel_info */

CL_KERNEL_FUNCTION_NAME =0x1190;

CL_KERNEL_NUM_ARGS =0x1191;

CL_KERNEL_REFERENCE_COUNT =0x1192;

CL_KERNEL_CONTEXT =0x1193;

CL_KERNEL_PROGRAM =0x1194;

```
/* cl_kernel_work_group_info */
CL_KERNEL_WORK_GROUP_SIZE =0x11B0;
CL_KERNEL_COMPILE_WORK_GROUP_SIZE =0x11B1;
CL_KERNEL_LOCAL_MEM_SIZE =0x11B2;
CL_KERNEL_PREFERRED_WORK_GROUP_SIZE_MULTIPLE
=0x11B3;
CL_KERNEL_PRIVATE_MEM_SIZE =0x11B4;
/* cl_event_info */
CL_EVENT_COMMAND_QUEUE =0x11D0;
CL_EVENT_COMMAND_TYPE =0x11D1;
CL_EVENT_REFERENCE_COUNT =0x11D2;
CL_EVENT_COMMAND_EXECUTION_STATUS =0x11D3;
CL_EVENT_CONTEXT =0x11D4;
/* cl_command_type */
CL_COMMAND_NDRANGE_KERNEL =0x11F0;
CL_COMMAND_TASK =0x11F1;
CL_COMMAND_NATIVE_KERNEL =0x11F2;
CL_COMMAND_READ_BUFFER =0x11F3;
CL_COMMAND_WRITE_BUFFER =0x11F4;
CL_COMMAND_COPY_BUFFER =0x11F5;
CL_COMMAND_READ_IMAGE =0x11F6;
CL_COMMAND_WRITE_IMAGE =0x11F7;
CL_COMMAND_COPY_IMAGE =0x11F8;
CL_COMMAND_COPY_IMAGE_TO_BUFFER =0x11F9;
CL_COMMAND_COPY_BUFFER_TO_IMAGE =0x11FA;
CL_COMMAND_MAP_BUFFER =0x11FB;
CL_COMMAND_MAP_IMAGE =0x11FC;
CL_COMMAND_UNMAP_MEM_OBJECT =0x11FD;
CL_COMMAND_MARKER =0x11FE;
```

CL_COMMAND_ACQUIRE_GL_OBJECTS =0x11FF;

CL_COMMAND_RELEASE_GL_OBJECTS =0x1200;

CL_COMMAND_READ_BUFFER_RECT =0x1201;

CL_COMMAND_WRITE_BUFFER_RECT =0x1202;

CL_COMMAND_COPY_BUFFER_RECT =0x1203;

CL_COMMAND_USER =0x1204;

/* command execution status */

CL_COMPLETE =0x0;

CL_RUNNING =0x1;

CL_SUBMITTED =0x2;

CL_QUEUED =0x3;

/* cl_buffer_create_type */

CL_BUFFER_CREATE_TYPE_REGION =0x1220;

/* cl_profiling_info */

CL_PROFILING_COMMAND_QUEUED =0x1280;

CL_PROFILING_COMMAND_SUBMIT =0x1281;

CL_PROFILING_COMMAND_START =0x1282;

CL_PROFILING_COMMAND_END =0x1283;

/*

* cl_ext.h

*/

/* cl_khr_fp64 extension - no extension since it has no functions */

CL_DEVICE_DOUBLE_FP_CONFIG =0x1032;

/* cl_khr_fp16 extension - no extension since it has no functions */

CL_DEVICE_HALF_FP_CONFIG =0x1033;

/**********************

* cl_khr_icd extension *

**********************/

/* cl_platform_info */

CL_PLATFORM_ICD_SUFFIX_KHR =0x0920;

/* Additional Error Codes */

CL_PLATFORM_NOT_FOUND_KHR =-1001;

/******************************
* cl_nv_device_attribute_query extension *
******************************/

/* cl_nv_device_attribute_query extension - no extension since it has no functions */

CL_DEVICE_COMPUTE_CAPABILITY_MAJOR_NV =0x4000;

CL_DEVICE_COMPUTE_CAPABILITY_MINOR_NV =0x4001;

CL_DEVICE_REGISTERS_PER_BLOCK_NV =0x4002;

CL_DEVICE_WARP_SIZE_NV =0x4003;

CL_DEVICE_GPU_OVERLAP_NV =0x4004;

CL_DEVICE_KERNEL_EXEC_TIMEOUT_NV =0x4005;

CL_DEVICE_INTEGRATED_MEMORY_NV =0x4006;

/******************************
* cl_amd_device_attribute_query *
******************************/

CL_DEVICE_PROFILING_TIMER_OFFSET_AMD =0x4036;

/* cl_device_partition_property_ext */

CL_DEVICE_PARTITION_EQUALLY_EXT =0x4050;

CL_DEVICE_PARTITION_BY_COUNTS_EXT =0x4051;

CL_DEVICE_PARTITION_BY_NAMES_EXT =0x4052;

CL_DEVICE_PARTITION_BY_AFFINITY_DOMAIN_EXT =0x4053;

/* clDeviceGetInfo selectors */

CL_DEVICE_PARENT_DEVICE_EXT =0x4054;

CL_DEVICE_PARTITION_TYPES_EXT =0x4055;

CL_DEVICE_AFFINITY_DOMAINS_EXT =0x4056;

CL_DEVICE_REFERENCE_COUNT_EXT =0x4057;

CL_DEVICE_PARTITION_STYLE_EXT =0x4058;

/* error codes */

CL_DEVICE_PARTITION_FAILED_EXT =-1057;

CL_INVALID_PARTITION_COUNT_EXT =-1058;

CL_INVALID_PARTITION_NAME_EXT =-1059;

/* CL_AFFINITY_DOMAINs */

CL_AFFINITY_DOMAIN_L1_CACHE_EXT =0x1;

CL_AFFINITY_DOMAIN_L2_CACHE_EXT =0x2;

CL_AFFINITY_DOMAIN_L3_CACHE_EXT =0x3;

CL_AFFINITY_DOMAIN_L4_CACHE_EXT =0x4;

CL_AFFINITY_DOMAIN_NUMA_EXT =0x10;

CL_AFFINITY_DOMAIN_NEXT_FISSIONABLE_EXT =0x100;

/* cl_device_partition_property_ext list terminators */

CL_PROPERTIES_LIST_END_EXT =0;

CL_PARTITION_BY_COUNTS_LIST_END_EXT =0;

CL_PARTITION_BY_NAMES_LIST_END_EXT =-1;

/********************************
* cl_amd_device_attribute_query *
********************************/

/* cl_gl_object_type */

CL_GL_OBJECT_BUFFER =0x2000;

CL_GL_OBJECT_TEXTURE2D =0x2001;

CL_GL_OBJECT_TEXTURE3D =0x2002;

CL_GL_OBJECT_RENDERBUFFER =0x2003;

/* cl_gl_texture_info */

CL_GL_TEXTURE_TARGET =0x2004;

CL_GL_MIPMAP_LEVEL =0x2005;

/* Additional Error Codes */

CL_INVALID_GL_SHAREGROUP_REFERENCE_KHR =-1000;

```
/* cl_gl_context_info */
CL_CURRENT_DEVICE_FOR_GL_CONTEXT_KHR =0x2006;
CL_DEVICES_FOR_GL_CONTEXT_KHR =0x2007;
/* Additional cl_context_properties */
CL_GL_CONTEXT_KHR =0x2008;
CL_EGL_DISPLAY_KHR =0x2009;
CL_GLX_DISPLAY_KHR =0x200A;
CL_WGL_HDC_KHR =0x200B;
CL_CGL_SHAREGROUP_KHR =0x200C;
/*
 * cl_khr_gl_event extension
 * See section 9.9 in the OpenCL(TM) 1.1 spec for more information
 */
CL_COMMAND_GL_FENCE_SYNC_OBJECT_KHR =0x200D;
};
```

Thus, the WebCL framework is provided.

As described above, the WebCL framework advantageously may support and be used with WebCL extensions 26.

A first example WebCL extension, consider the cl_gl_sharing extension. The cl_gl_sharing extension is an extension that may provide that WebCL methods may use, e.g., as their argument, objects of the WebGL™ framework. This extension may also provide that WebGL methods may use, e.g., as their argument, objects of the WebCL framework.

The cl_gl_sharing extension advantageously tends to provide that buffers (e.g., the shared buffer 58) may be shared between WebCL and WebGL contexts. The cl_gl_sharing extension may comprise a plurality of methods and may be defined as follows:

```
class WebCLGL {
any getGLContextInfo(context: WebCLContext, properties: number,
param_name: number);
void createFromGLBuffer(context: WebCLContext, flags: number, buffer:
WebGLBuffer);
void createFromGLTexture2D(context: WebCLContext, flags: number,
texture_target: number, miplevel: number, texture: WebGLTexture);
void createFromGLTexture3D(context: WebCLContext, flags: number,
texture_target: number, miplevel: number, texture: WebGLTexture);
number getGLObjectInfo(mem_obj: WebCLMemObject); // returns
gl_object_type
any getGLTextureInfo(mem_obj: WebCLMemObject, param_name:
number, ); // returns param_value (number for now)
WebCLEvent enqueueAcquireGLObject(queue: WebCLCommandQueue,
mem_objects: WebCLMemObject[ ], event_wait_list: WebCLEvent[ ]);
WebCLEvent enqueueReleaseGLObject(queue: WebCLCommandQueue,
mem objects: WebCLMemObject[ ], event wait list: WebCLEvent[ ]);
// Objects not available in WebGL 1.0
void createFromGLRenderbuffer(context: WebCLContext, flags: number,
renderbuffer: WebGLRenderBuffer);
}
```

In other embodiments, one or more of the methods included in the cl_gl_sharing extension and described above may be omitted. Also, in other embodiments, the cl_gl_sharing extension may comprise one or more different methods instead of or in addition to one or more of the methods included in the cl_gl_sharing extension and described above. Thus, the cl_gl_sharing extension may be defined in a different way, for example, as follows:

```
interface WebCLGL {
// Functions
WebCLMemoryObject clCreateFromGLBuffer(WebCLContext context,
CLenum flags,
WebGLBuffer bufobj);
WebCLMemoryObject createFromGLTexture2D(WebCLContext context,
CLenum flags,cl_GLenum target, cl_GLint miplevel, cl_GLuint texture);
WebCLMemoryObject createFromGLTexture3D(WebCLContext context,
CLenum flags,cl_GLenum target, cl_GLint miplevel, cl_GLuint texture);
WebCLMemoryObject createFromGLRenderbuffer(WebCLContext context,
CLenum flags,cl_GLuint renderbuffer);
WebGLObject getGLObjectInfo(WebCLMemoryObject memobj);
any getGLTextureInfo(WebCLMemoryObject memobj, cl_gl_texture_info
param_name);
WebCLEvent enqueueAcquireGLObjects(WebCLCommandQueue
command_queue, WebCLMemoryObject[ ] mem_objects,
optional WebCLEvent[ ] event_wait_list,
optional CLboolean generate_event = false);
WebCLEvent enqueueReleaseGLObjects(WebCLCommandQueue
command_queue, WebCLMemoryObject[ ] mem_objects,
optional WebCLEvent[ ] event_wait_list,
optional CLboolean generate_event = false);
// Constants
/* cl_gl_object_type */
const CLenum GL_OBJECT_BUFFER = 0x2000;
const CLenum GL_OBJECT_TEXTURE2D = 0x2001;
const CLenum GL_OBJECT_TEXTURE3D = 0x2002;
const CLenum GL_OBJECT_RENDERBUFFER = 0x2003;
/* cl_gl_texture_info */
const CLenum GL_TEXTURE_TARGET = 0x2004;
const CLenum GL_MIPMAP_LEVEL = 0x2005;
/* Additional Error Codes */
const CLenum INVALID_GL_SHAREGROUP_REFERENCE = -1000;
/* cl_gl_context_info */
const CLenum CURRENT_DEVICE_FOR_GL_CONTEXT = 0x2006;
const CLenum DEVICES_FOR_GL_CONTEXT = 0x2007;
/* Additional cl_context_properties */
const CLenum GL_CONTEXT = 0x2008;
}
```

The following list of methods includes methods that may be included in the cl_gl_sharing extension and describes uses of those methods. Also, in the following list, for each parameter of the methods in the cl_gl_sharing extension a default value is provided.
1. WebCLMemoryObject clCreateFromGLBuffer(WebCL-Context context, CLenum flags, WebGLBuffer bufobj);
2. WebCLMemoryObject createFromGLTexture2D(Web-CLContext context, CLenum flags, GLenum target, GLint miplevel, GLuint texture);
3. WebCLMemoryObject createFromGLTexture3D(Web-CLContext context, CLenum flags, GLenum target, GLint miplevel, GLuint texture);
4. WebCLMemoryObject createFromGLRenderbuffer(Web-CLContext context, CLenum flags, WebGLRenderBuffer renderbuffer);
5. WebGLObjectInfo getGLObjectInfo(WebCLMemoryObject memobj);

This method may return information about the WebGL object used to create a WebCL memory object. The Web-GLObjectInfo may be a dictionary defined as follows:

```
dictionary WebCLGLObjectInfo {
  "type" : CLenum, // can be GL_OBJECT_BUFFER,
  GL_OBJECT_TEXTURE2D, GL_OBJECT_TEXTURE3D, or
  GL_OBJECT_RENDERBUFFER
  "name" : WebGLObject // the WebGLObject used to create
  theWebCLMemoryObject memobj
}
```

6. any getGLTextureInfo(WebCLMemoryObject memobj, CLenum param_name);

This method may return additional information about a GL texture object associated with a WebCL memory object.
7. WebCLEvent enqueueAcquireGLObjects(WebCLCommandQueue command_queue, WebCLMemoryObject[ ] mem_objects, optional WebCLEvent[ ] event_wait_list, optional CLboolean generate_event=false);
8. WebCLEvent enqueueReleaseGLObjects(WebCLCommand Queue command_queue, WebCLMemoryObject[ ] mem_objects, optional WebCLEvent[ ] event_wait_list, optional CLboolean generate_event=false);

The cl_gl_sharing extension may be used to link together WebGL™ and WebCL. In particular, the cl_gl_sharing extension tends to provide that buffers may be shared between WebCL and WebGL contexts (i.e., values in a buffer may be processed by a program running in a WebCL context and a program running in a WebGL context).

A second example WebCL extension 26 is the WebCL-GLSync extension. This extension allows creation of OpenCL™ event objects linked to OpenGL fence sync objects. Advantageously, this tends to improve efficiency of sharing images and buffers between the WebCL and WebGL contexts. The WebCLGLSync extension may comprise a plurality of methods and may be defined as follows:

```
interface WebCLGLSync {
WebCLEvent createEventFromGLsync(WebCLContext context, GLsync sync);
}
```

The following method may be included in the WebCL-GLSync extension:
  WebCLEvent createEventFromGLsync(WebCLContext context, GLsync sync);

Further example extensions to the WebCL framework include WebCL compiler extensions. These extensions do not provide new JavaScript™ methods and constants. Instead, these extensions may be used to indicate support in an OpenCL™ C compiler for features a developer may use, e.g., for enhancing kernel code. For example, if a Web-CLDevice.getExtension(extension_name) command returns a non-null object, support for that extension name is indicated. The WebCL compiler extensions may be defined as follows:

```
interface int64_base_atomics {(OpenCL(TM) 1.1 §4.1, man page)
}
interface int64_extended_atomics {(OpenCL(TM) 1.1 §4.1, man page)
}
interface fp16 {(OpenCL(TM) 1.1 §4.1, man page)
}
interface fp64 {(OpenCL(TM) 1.1 §4.1, man page)
}
interface 3d_image_writes {(OpenCL(TM) 1.1 §4.1, man page)
}
``` where (OpenCL™ 1.1 §4.1, man page) are publically available OpenCL™ extensions. The WebCL framework may be further extended to include memory mapping commands for the above described WebCLCommandQueue interface. These memory mapping commands are defined below. These memory mapping commands may be used to map a region of a device buffer object (e.g., the WebCL memory object 52 on the GPU 30) into a host address space. For example, a GPU buffer may be mapped onto a CPU memory. This advantageously tends to allow for modification of the returned mapped region object. The memory mapping commands may be provided by modifying the WebCLCommandQueue interface as follows:

```
interface WebCLCommandQueue {
ArrayBuffer enqueueMapMemObject(WebCLRegion buffer, CLboolean
blocking_map, CLenum map_flags, optional WebCLEvent[ ]
event_wait_list,);
WebCLCommandQueue
enqueueUnmapMemObject(WebCLMemoryObject
memory, ArrayBuffer mapped_region, optional WebCLEvent[ ]
event_wait_list);
}
```

The following list of methods includes methods that may be included in this definition of the WebCLCommandQueue interface.
1. ArrayBuffer enqueueMapMemObject(WebCLRegion buffer, CLboolean blocking_map, CLenum map_flags, optional WebCLEvent[ ] event_wait_list, optional CLboolean generate_event=false);

In some embodiments, WebCLBuffer and WebCLImage may be WebCL Memory Objects. This tends to provide mapping of device memory regions onto the host memory. In one embodiment, WebCLRegion is a dictionary defining the origin and size of the region of the memory object to be mapped.
2. WebCLCommandQueue enqueueUnmapMemObject (WebCLMemoryObject memory, ArrayBuffer mapped_region, optional WebCLEvent[ ] event_wait_list);

This method may unmap a previously mapped region with enqueueMapMemObject( ). Maped_region is an ArrayBuffer returned by enqueueMapMemObject.

In the above described WebCL framework, setting the arguments of a kernel typically would use knowledge of a C-structure used as arguments in a kernel method. However, since JavaScript™ is untyped, it tends to be difficult or impossible to uniquely map JavaScript™ types to native C types.

The above described WebCL framework comprises the method WebCLKernel.setArg(CLuint index, any value, optional CLtype type). This method advantageously tends to allow any value to be passed to an OpenCL™ kernel. This method tends to be particularly suitable for basic scalar and vector types.

An example extension to the WebCL framework that may be used to set data types in a C area of memory is the ctypes extension. The ctypes extension may be defined as follows:

```
interface ctypes {
// methods
ArrayBuffer compile(ctypes_struct struct);
CLuint size(ctypes_struct struct);
// constants containing host-dependent sizes
// basic types
const CLuint bool = sizeof(bool);
const CLuint char = 1
const CLuint short = 2
const CLuint int = 4
const CLuint long = 8
const CLuint float = 4;
const CLuint double = 8; // if supported
const CLuint half = 2; // if supported
// special C types
const CLuint size = 4;
const CLuint ptrdiff = 4;
const CLuint intptr = 4;
// vector types (for convenience) with n = 2, 3, 4, 8, 16
const CLuint charn = 1 * n;
const CLuint shortn = 2 * n;
const CLuint intn = 4 * n;
const CLuint longn = 8 * n;
const CLuint floatn = 4 * n;
const CLuint doublen = 8 * n; // if supported
const CLuint halfn = 2 * n; // if supported
// matrices types (for convenience) with m or n = 2, 3, 4
const CLuint shortmxn = 2 * m * n;
const CLuint intmxn = 4 * m * n;
const CLuint longmxn = 8 * m * n;
const CLuint floatmxn = 4 * m * n;
const CLuint doublemxn = 8 * m * n; // if supported
const CLuint halfmxn = 2 * m * n; // if supported
// special OpenCL(TM) objects
const CLuint mem = sizeof(cl_mem);
const CLuint image2d = mem;
const CLuint image3d = mem;
const CLuint sampler = sizeof(cl_sampler);
const CLuint event = sizeof(cl_event);
// local memory
const CLuint local = 0; // 0 because local memory can't be initialized
}
```

The following list of methods includes methods that may be included in the ctypes extension and describes uses of those methods. Also, in the following list, for each parameter of the methods in the ctypes extension a default value is provided.

1. ArrayBuffer compile(ctypes_struct astruct);
This method compiles a ctypes_struct definition into an ArrayBuffer. The ctypes_struct is a dictionary of fields in the C-structure. Fields may be defined in the same order as they are in the C struct defined in the kernel method, e.g., as follows:

```
dictionary ctypes_struct {
CLuint name = 0;
}
``` where name is the name of a field and its value represents its size using ctypes constants. If the value is not defined, the size may be a default size, e.g., 0.

2. CLuint size(ctypes_struct astruct);
This method computes the size in bytes of a ctypes_struct.

An example code specifying an example method of setting the values of a C area of memory and to computing its size is as follows:

```
// in C
//struct point {
// float x, y, z;
// char name[10];
//}
// in JavaScript(TM)
var point_struct = {
"x" : ctypes.float,
"y" : ctypes.float,
"z" : ctypes.float,
"name" : ctypes.Array(ctypes.char,10),
};
// or
var point struct = {
"xyz" : ctypes.Array(ctypes.float, 3),
"name" : ctypes.Array(ctypes.char, 10),
}
// the point structure values are set in an ArrayBuffer
// the size of point_struct should be 4 * 3 + 1 * 10 = 17 bytes
kernel.setArg(1, buffer, ctypes.size(point_struct) );
// alternatively one could define values of each field
var point_struct = {
"x" : { ctypes.float, −5.4 },
"y" : { ctypes.float, −10 },
"z" : { ctypes.float, 12.45 },
"name" : { ctypes.Array(ctypes.char,10), "point1" }
};
// or
var point_struct = {
"xyz" : { ctypes.Array(ctypes.float, 3), [ −5.4, −10, 12.45 ] },
"name" : { ctypes.Array(ctypes.char,10), ['p','o','i','n','t','1','\0' ] },
}
// and call setArg
kernel.setArg(1, ctypes.compile(point_struct), ctypes.size(point_struct) );
// in C
//struct point {
// float3 vec;
// float12 mat;
//}
// in JavaScript(TM)
var point struct = {
"vec" : ctypes.Array(ctypes.float, 3);
"mat" : ctypes.Array(ctypes.float, 12);
};
// or
var point_struct = {
"vec" : ctypes.float3,
"mat" : ctypes.float12, // or float3x4
}
// the point structure values are set in an ArrayBuffer
// the size of point_struct should be 4 * 3 + 4 * 12 = 60 bytes
kernel.setArg(1, buffer, ctypes.size(point_struct) );
```

Now is an example of a script that may be used to perform a task of adding together two vectors. The example script is as follows:

```
var log=console.log;
function VectorAdd( ) {
//First check if the WebCL extension is installed at all
if (WebCL == undefined) {
```

```
alert("WebCL not supported.");
return;
}
BUFFER_SIZE=10; // for example
var A=new Uint32Array(BUFFER_SIZE);
var B=new Uint32Array(BUFFER_SIZE);
var C=new Uint32Array(BUFFER_SIZE);
for (var i = 0; i < BUFFER_SIZE; i++) {
A[i] = i;
B[i] = i * 2;
C[i] = 0;
}
//Pick platform
varplatformList=WebCL.getPlatformIDs( );
platform=platformList[0]; // select the first platform
// create GPU context for this platform
context=new
WebCL.WebCLContext(WebCL.CL_DEVICE_TYPE_GPU,[WebCL.CL_C
ONTEXT_PLATFORM, platform]);
//Query the set of devices attached to the context
devices = context.getInfo(WebCL.CL_CONTEXT_DEVICES);
kernelSource = [
"__kernel void ",
"vadd( __global int * a, __global int * b, __global int * c) ",
"{ ",
" size_t i = get_global_id(0); ",
" ",
"c[i] = a[i] + b[i]; ",
"} "
].join("\n");
// Create and program from String source
program = context.createProgram(kernelSource);
// Build program
program.build(devices); // note: no compilation flags given
// Create device buffers
size=BUFFER_SIZE*4; // size in bytes
// Create buffer for A and copy host contents
aBuffer = context.createBuffer(WebCL.CL_MEM_READ_ONLY, size);
// Create buffer for B and copy host contents
bBuffer = context.createBuffer(WebCL.CL_MEM_READ_ONLY, size);
// Create buffer for that uses the host ptr C
cBuffer = context.createBuffer(WebCL.CL_MEM_WRITE_ONLY, size);
// Create kernel object
kernel= program.createKernel("Vadd");
// Set kernel args
kernel.setArg(0, aBuffer);
kernel.setArg(1, bBuffer);
kernel.setArg(2, cBuffer);
// Create command queue
queue=context.createCommandQueue(devices[0], 0);
// Init ND-range
var localWS = [6];
var globalWS = [Math.ceil (BUFFER_SIZE / localWS) * localWS];
log("Global work item size: " + globalWS);
log("Local work item size: " + localWS);
// Execute (enqueue) kernel
log("using enqueueNDRangeKernel");
queue.enqueueNDRangeKernel(kernel,
[ ],
[globalWS],
[localWS]);
// Do the work
queue.enqueueWriteBuffer (aBuffer, false, 0, A.length*4, A, [ ]);
queue.enqueueWriteBuffer (bBuffer, false, 0, B.length*4, B, [ ]);
queue.enqueueReadBuffer (cBuffer, false, 0, C.length*4, C, [ ]);
queue.finish ( ); //Finish all the operations
// print results
}
```

A further example of script that may be used to add two vectors is as follows.

```
    log("using enqueueMapBuffer");
    // Map cBuffer to host pointer. This enforces a sync with
    // the host backing space, remember we choose GPU device.
    output=queue.enqueueMapBuffer(
    cBuffer,
    true, // block
    WebCL.CL_MAP_READ,
    0,
    BUFFER_SIZE * 4);
    // print results
```

```
queue.enqueueUnmapMemObject(
    cBuffer,
    output);
}
```

The WebCL specification advantageously provides additional computing context objects for the HTML5 specification. These content objects tend to allow computing using an application programming interface that conforms closely to the OpenCL™ API).

An advantage provided by the above described WebCL specification, methods, and systems is that increased security tends to be provided. Some OpenCL™ methods, when implemented, return information that may be used to identify the one or more memory regions (e.g., a memory address) of a computer. A malicious party may use this information to access parts of the computer memory. The above described WebCL framework advantageously tends not to return (i.e., hides) this memory address information. Thus, the above described WebCL framework tends to provide a higher level of security than, e.g., the OpenCL™ framework.

The above described WebCL specification tends to allow for a JavaScript™ API design that is familiar to many computer programmers.

The above described WebCL specification tends to have fewer methods than other frameworks (e.g., the OpenCL™). Method overloading has advantageously been exploited to provide this. The WebCL specification provides an object-oriented representation of OpenCL™ that tends to be relatively simple compared to OpenCL™.

An advantage provided by the above described WebCL specification, methods, and systems is that a method that creates an object is attached to the object that creates it. This is instead of that method being a constructor of the created object. For example, if a first WebCL object calls a, for example, "create platform" method, a "WebCL Platform Object" is returned. The first WebCL object is a "parent" of the WebCL Platform Object, i.e., the WebCL Platform Object is a "child" of the first WebCL object. The parent and child objects are linked. For example, if a parent objects is deleted, its children are automatically deleted. This is advantageous, for example, during memory reclamation. This is in contrast to, for example, the OpenCL™ framework.

In the above described WebCL framework, exceptions are used instead of error codes. If an exception is returned (or "thrown"), then an argument of the exception may contain details of the corresponding OpenCL™ error. This use of exceptions as opposed to error messages advantageously tends to avoid a "cascade" of run-time errors. Thus, by using exceptions, lock-down (e.g., of the GPU) may be avoided.

In the above described WebCL framework, all objects are assigned to a unique module or package.

Conveniently, the constants used by the above described WebCL framework are those of the OpenCL™ framework.

In the above described WebCL framework, OpenCL™ Event and UserEvent classes are advantageously merged into a single class, namely the WebCLEvent class. Thus, in JavaScript™ only a single Event Object is used. For a software developer, this tends to simplify the process of creating a computer program.

A method by which the above described WebCL framework may be extended is advantageously provided. For example, extensions that allow WebCL and WebGL to interoperate are advantageously provided. These extensions advantageously tend to facilitate rendering of GPU-accelerated buffers from OpenCL™ using OpenGL standards. This tends to avoiding information transfer from the GPU to the CPU. Further extensions to the WebCL framework tend to provide JavaScript™ representations of OpenCL™ extensions for compiler features available in a GPU. This beneficially tends to allow a software developer to select the best kernel for various applications.

The above described WebCL framework advantageously tends to enable web applications to harness GPU and multi-core CPU parallel processing, e.g., from within a web browser. This tends to enable significant acceleration of applications such as image and video processing and advanced physics e.g., for WebGL games. Furthermore, the WebCL framework tends to extend the capabilities of, e.g., an HTML 5 web browser to accelerate computationally intensive and rich visual computing applications.

In the above embodiments, running the script (which in the above embodiments is JavaScript™ but may be a different type of script) by the machine processor (which in the above embodiments is a JavaScript™ module but may be a different type of machine processor) creates a context for an underlying processing unit (e.g., the GPU). Also in the above embodiments, running the script by the machine processor creates a memory object or buffer within the created context. However, in other embodiments, running the script by the machine processor may implement different types of objects within a created context or may implement different types of functions within the created context. This may be instead of or in addition to creating the memory object or buffer within the context. Also, in other embodiments running the script by the machine processor may create a memory object or buffer that is not within a created context.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A computer-implemented method of providing a download script for download to a machine processor, the method comprising:
    sending, from a first client device to a first web server, a request for an extension, the extension identifying one or more bindings to a corresponding function in a function library, the function library comprising one or more functions executable by one or more underlying processing units for implementing parallel processing, the function library being operatively connected to a machine processor of a second client device;
    receiving, from the first web server, a specification of the extension based on the request sent to the first web server;
    generating, on the first client device, a download script based on the specification, the download script comprising the one or more bindings identified by the extension; and
    sending for upload, from the first client device to a second web server, the download script, the second web server being accessible by the first client device, the download script being generated by the first client device for download to the machine processor of the second client device from the second web server, the machine processor having access to the one or more underlying processing units for calling, from the function library, a function corresponding to a binding identified by the download script, wherein the download script comprises one or more commands to call a function corresponding to at least one of the one or more bindings identified by the extension, each of the one or more commands including an instruction to the machine processor of the second client device, wherein the download script, which when executed on the machine processor, causes:

the function corresponding to the binding to be implemented on the one or more underlying processing units, and the machine processor to create one or more first command queues associated with the one or more underlying processing units.

2. The computer-implemented method of claim 1, wherein the one or more functions are OpenCL functions.

3. The computer-implemented method of claim 1, wherein the download script is generated in JavaScript.

4. The computer-implemented method of claim 1, further comprising:

sending, from the first client device to the first web server, a second request for a list of available extensions to be returned to the first client device, the second request sent prior to the request for the extension;

receiving, from the first web server, the list of available extensions; and identifying the extension from the list of available extensions based on a user selection.

5. The computer-implemented method of claim 1, wherein the first web server comprises an extension repository, wherein the extension repository comprises a plurality of extensions, wherein the first web server is configured to return, to the first client device, the specification based on at least one of the plurality of extensions in the extension repository.

6. The computer-implemented method of claim 1, wherein the download script comprises one or more download commands for the machine processor, and wherein the download script causes the machine processor to:

create, for each of the one or more underlying processing units, a respective context in which the one or more functions are executed to provide parallel contexts, and execute, on the one or more underlying processing units corresponding to the respective context, at least a portion of the download script.

7. The computer-implemented method of claim 6, wherein the download script causes the machine processor to create, for a context, one or more second command queues for containing a list of the one or more functions to be executed within the context.

8. The computer-implemented method of claim 6, wherein the machine processor has access to a second function library, the second function library comprising one or more second functions, the one or more second functions being implementable by the one or more underlying processing units for implementing graphics processing, wherein the download script comprises one or more second download commands for the machine processor, each of the one or more second download commands comprising a binding to a corresponding second function in the second function library, wherein the download script causes the machine processor to:

create, for each of the one or more underlying processing units, a respective second context in which the one or more functions are executed, and execute, on the one or more underlying processing units corresponding to the respective second context, at least a portion of the download script.

9. The computer-implemented method of claim 8, wherein the one or more second functions are OpenGL functions.

10. The computer-implemented method of claim 8, wherein execution of the at least a portion of the download script creates, for the respective second context, a buffer, the buffer being associated with at least a portion of a memory of the underlying processing unit corresponding to the respective second context into which data may be transferred from the machine processor, and wherein data stored within the buffer is processed by running the download script within at least one of the respective context or the respective second context.

11. The computer-implemented method of claim 10, wherein the requested extension specifies how the buffer is used by the download script when the download script is executed within the respective context or the respective second context.

12. The computer-implemented method of claim 10, wherein the download script, when executed by the machine processor, causes the machine processor to create, for a context, a memory object or buffer associated with at least a portion of the memory of the underlying processing unit corresponding to the context into which data may be transferred from the machine processor.

13. The computer-implemented method of claim 12, wherein the memory object or buffer includes information identifying a data type for each data item within the memory object or buffer, the data type providing that data is stored in the memory object or buffer as a typed array.

14. The computer-implemented method of claim 12, wherein the download script, when executed by the machine processor, causes data, after the data is processed by the one or more underlying processing units, to be transferred from the memory object or buffer to a memory of the machine processor.

15. The computer-implemented method of claim 14, wherein the download script, when executed by the machine processor, causes the machine processor to:

transfer the data from the machine processor into the memory object or buffer, and implement the one or more functions within the context for which the memory object or buffer was created to cause the underlying processing unit to process the data transferred into the memory object or buffer.

16. The computer-implemented method of claim 15, wherein the download script, when executed by the machine processor, causes the machine processor to create one or more third command queues for controlling the data transferred from a web browser into the memory object or buffer.

17. The computer-implemented method of claim 15, wherein the download script, when executed by the machine processor, causes the machine processor to create one or more fourth command queues for controlling the data transferred from the memory object or buffer to the machine processor.

18. The computer-implemented method of claim 1, wherein the download script specifies at least a portion of a web page, a web site, or a web application.

19. The computer-implemented method of claim 1, wherein the underlying processing unit is selected from a group consisting of a graphical processing unit and a central processing unit.

20. A web server comprising:
an extension repository having a plurality of extensions;
one or more processors;
a memory comprising instructions, which when executed by the one or more processors, cause the web server to:
  receive, from a first client device, a request for an extension to be returned to the first client device; and
  send, to the first client device, a specification of the requested extension in response to receiving the request, the requested extension corresponding to an extension of the plurality of extensions, the requested extension specifying one or more bindings to a corresponding function within a function library, the one or more bindings being included in a download script generated by the first client device based on the specification for download to a machine processor of a second client device from a second web server, the function library being operatively connected to the machine processor, the machine processor having access to an underlying processing unit for performing data processing, the function library having functions implementable by the underlying processing unit for implementing parallel processing,
wherein the download script comprises one or more commands to call a function corresponding to at least one of the one or more bindings specified by the requested extension, each of the one or more commands including an instruction to the machine processor of the second client device,
wherein the download script, which when executed on the machine processor, causes:
  the function corresponding to the binding to be implemented on the underlying processing unit, and
  the machine processor to create one or more command queues associated with the underlying processing unit.

* * * * *